United States Patent
Seong

(10) Patent No.: US 11,177,702 B2
(45) Date of Patent: Nov. 16, 2021

(54) POSITION ALIGNMENT APPARATUS AND METHOD FOR WIRELESS POWER TRANSFER

(71) Applicants: Hyundai Motor Company, Seoul (KR); Kia Motors Corporation, Seoul (KR)

(72) Inventor: Jae Yong Seong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/668,977

(22) Filed: Oct. 30, 2019

(65) Prior Publication Data

US 2020/0136438 A1    Apr. 30, 2020

Related U.S. Application Data

(60) Provisional application No. 62/753,290, filed on Oct. 31, 2018.

(30) Foreign Application Priority Data

Oct. 15, 2019   (KR) .......................... 10-2019-0127915

(51) Int. Cl.
  *H02J 50/90*    (2016.01)
  *H02J 50/10*    (2016.01)
  (Continued)

(52) U.S. Cl.
  CPC .............. *H02J 50/90* (2016.02); *B60L 53/12* (2019.02); *H02J 50/10* (2016.02); *H02J 50/40* (2016.02)

(58) Field of Classification Search
  None
  See application file for complete search history.

(56) References Cited

U.S. PATENT DOCUMENTS 5,821,731 A * 10/1998 Kuki ....................... H02J 7/025
                                                    320/108
2015/0137801 A1   5/2015 Raedy et al.
(Continued)

FOREIGN PATENT DOCUMENTS

EP        3 364 522 A1    8/2018
WO     2017/165549 A1    9/2017

*Primary Examiner* — Daniel Kessie
(74) *Attorney, Agent, or Firm* — Mintz Levin Cohn Ferris Glovsky and Popeo, P.C.; Peter F. Corless

(57) ABSTRACT

A position alignment method, performed by a vehicle assembly (VA) including a reception pad receiving power transmitted from a transmission pad of a ground assembly (GA) is provided. The method includes transmitting a magnetic field using a transmitting device disposed on a reception pad, the transmitting device operating with low frequency (LF); receiving a magnetic field related value from the GA, the magnetic field being detected by an LF receiving device disposed on the transmission pad of the GA; and calculating, by a controller, a distance between the transmission pad and the reception pad using the magnetic field related value. A part of the transmitting device is disposed to arrange a magnetic field formed by the part of the transmitting device in a 0°, 90°, 180°, or 270° direction with respect to a magnetic field formed by a part of the LF receiving device.

12 Claims, 29 Drawing Sheets

(51) Int. Cl.
*H02J 50/40* (2016.01)
*B60L 53/12* (2019.01)

(56) References Cited

U.S. PATENT DOCUMENTS

| | | |
|---|---|---|
| 2016/0025821 A1 | 1/2016 | Widmer et al. |
| 2016/0059723 A1* | 3/2016 | Kim ..................... B60L 53/34 320/108 |
| 2017/0005523 A1 | 1/2017 | Widmer et al. |
| 2018/0244168 A1 | 8/2018 | Peer et al. |

* cited by examiner

<Radiation pattern of LF antenna
in a spherical coordinate system>

<Sin θ radiation pattern of LF antennaLF >

<Three-dimensional radiation pattern of LF antenna>

<angle between two antennas: 90°>

<angle between two antennas: 30°>

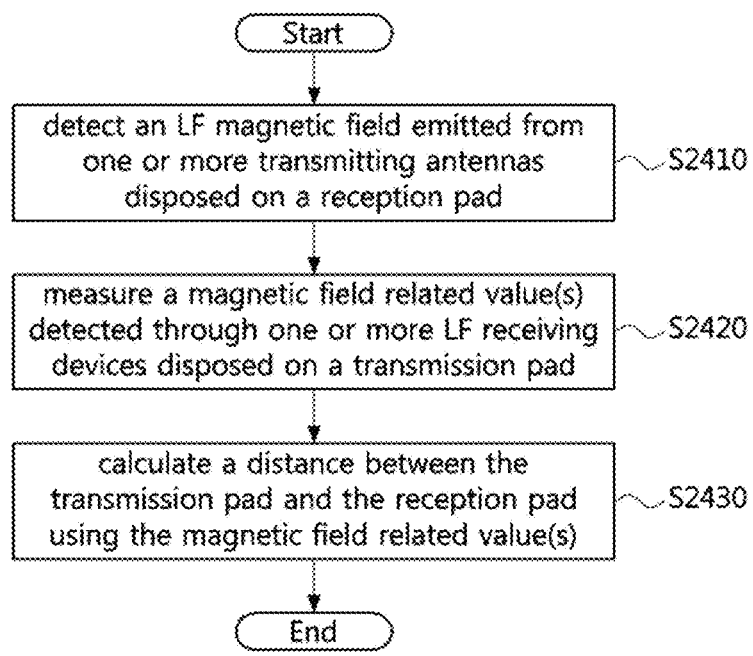

POSITION ALIGNMENT APPARATUS AND METHOD FOR WIRELESS POWER TRANSFER

CROSS-REFERENCES TO RELATED APPLICATIONS

This application claims the benefit of priority to U.S. Provisional Patent Application No. 62/753,290, filed on Oct. 31, 2018, and Korean Patent Application No. 10-2019-0127915, filed on Oct. 15, 2019, the entire contents of which are incorporated herein by reference.

TECHNICAL FIELD

The present disclosure relates to a method and an apparatus for measuring a vehicle position in wireless charging, and more specifically, to a method for measuring a vehicle position using low frequency (LF) signals, and an apparatus using the same.

BACKGROUND

An electric vehicle (EV) drives an electric motor by a power of a battery, and has less air pollution sources such as exhaust gas and noise compared with a conventional gasoline engine vehicle, fewer faults, a long life span, and, advantageously, the operation of the EV is simplified.

The EVs are classified into hybrid electric vehicles (HEVs), plug-in hybrid electric vehicles (PHEVs), and electric vehicles (EVs), based on a driving source. The HEV has an engine as a main power and a motor as an auxiliary power. The PHEV has a main power motor and an engine used when a battery is discharged. The EV has a motor, but the EV does not have an engine.

The wireless charging of the battery for driving the electric motor of the EV may be performed by coupling a primary coil of a charging station with a secondary coil of the EV in a magnetic resonance manner. Additionally, in a magnetic resonance wireless power transfer (WPT) system, if the primary and secondary coils are not aligned, the efficiency of the WPT may be reduced substantially. Therefore, the alignment of the primary coils and the secondary coils is required.

As a conventional alignment scheme, a technique has been developed of aligning an EV equipped with a secondary coil to a primary coil of a ground assembly (GA) using a rear camera. Another developed technique teaches moving a movable charging pad after an EV is parked in a parking area by a bump to align a primary coil of the charging pad with a secondary coil of the EV.

However, such conventional techniques may cause user's intervention in the alignment of the coils, inconvenience due to the user's intervention, and a substantial deviation of the alignment, which may lead to excessive system performance deterioration due to slight coil misalignment. Therefore, in the magnetic resonance WPT system sensitive to the misalignment of the coils, the optimum power transfer efficiency is difficult to realize, and the stability and reliability of the system is reduced.

Accordingly, there is a need for a method of more accurately measuring or estimating the position of the vehicle for alignment between the ground assembly of charging station and the vehicle assembly of electric vehicle in the WPT system.

SUMMARY

The present disclosure provides a position measurement method for wireless charging. Additionally, the present disclosure provides a position alignment apparatus using the position measurement method. Further, the present disclosure provides a magnetic field detection apparatus using the position measurement method.

According to exemplary embodiments of the present disclosure, a position alignment method, performed by a vehicle assembly (VA) including a reception pad receiving power transmitted from a transmission pad of a ground assembly (GA), may include transmitting at least one magnetic field using one or more transmitting devices disposed on the reception pad, the one or more transmitting devices operating with low frequency (LF); receiving at least one magnetic field related value from the GA, the at least one magnetic field being detected by one or more LF receiving devices disposed on the transmission pad of the GA; and calculating, by a controller, a distance between the transmission pad and the reception pad using the at least one magnetic field related value. At least one part of the one or more transmitting devices may be disposed to arrange at least one magnetic field formed by the at least one part of the one or more transmitting devices in a 0°, 90°, 180°, or 270° direction with respect to at least one magnetic field formed by at least one part of the one or more LF receiving devices.

The one or more transmitting devices may include three or more LF antennas disposed on respective sides of the reception pad. The one or more LF receiving devices may include three or more LF antennas or LF sensors disposed on respective sides of the transmission pad.

At least one of the one or more transmitting devices or at least one of the one or more LF receiving devices may be a single-axis LF antenna. At least one of the one or more transmitting devices or at least one of the one or more LF receiving devices may be a ferrite rod antenna.

The one or more transmitting devices may be disposed to arrange a longitudinal direction of a center of the one or more transmitting devices to be parallel to a side of the reception pad. The one or more LF receiving devices may be disposed to arrange a longitudinal direction of a center of the one or more LF receiving devices to be parallel to a side of the transmission pad.

A first transmitting device among the one or more transmitting devices may be disposed on a side different from a side on which a second transmitting device among the one or more transmitting devices is disposed, and the first transmitting device may be disposed perpendicular to the second transmitting device. A first transmitting device among the one or more transmitting devices may be disposed on a side different from a side on which a third transmitting device among the one or more transmitting devices is disposed, and the first transmitting device may be disposed parallel to the third transmitting device. A first LF receiving device among the one or more LF receiving devices may be disposed on a side different from a side on which a second LF receiving device among the one or more LF receiving devices is disposed, and the first LF receiving device may be disposed perpendicular to the second LF receiving device. A first LF receiving device among the one or more LF receiving devices may be disposed on a side different from a side on which a third LF receiving device among the one or more LF receiving devices is disposed, and the first LF receiving device may be disposed parallel to the third LF receiving device. The one or more transmitting devices and the one or more LF receiving devices may be disposed at points where a magnetic field formed by the reception coil of the reception pad or the transmission coil of the transmission pad is uniformly distributed.

Furthermore, according to exemplary embodiments of the present disclosure, a magnetic field detection apparatus may include a processor; and a memory storing at least one instruction executable by the processor, wherein when executed by the processor, the at least one instruction configures the processor to detect a magnetic field emitted from one or more transmitters operating with a low frequency (LF) disposed on a reception pad of a vehicle assembly (VA); measure at least one magnetic field related value detected by one or more LF receiving devices disposed on a transmission pad of a ground assembly (GA); and calculate a distance between the transmission pad and the reception pad using the at least one magnetic field related value.

At least one part of the one or more LF receiving devices may be disposed to arrange at least one magnetic field formed by the at least one part of the one or more LF receiving devices in a 0°, 90°, 180°, or 270° direction with respect to at least one magnetic field formed by at least part of the transmitters.

The one or more LF receiving devices may include three or more LF antennas or LF sensors disposed on respective sides of the transmission pad. The one or more LF receiving devices may be disposed to arrange a longitudinal direction of a center of the one or more LF receiving devices to be parallel to a side of the transmission pad. A first LF receiving device among the one or more LF receiving devices may be disposed on a side different from a side on which a second LF receiving device among the one or more LF receiving devices is disposed, and the first LF receiving device may be disposed perpendicular to the second LF receiving device.

Furthermore, according to exemplary embodiments of the present disclosure, a position alignment apparatus may include a processor; and a memory storing at least one instruction executable by the processor, wherein when executed by the processor, the at least one instruction configures the processor to transmit at least one magnetic field using one or more transmitters operating with a low frequency (LF) disposed on a reception pad receiving power transferred by a transmission pad of a ground assembly (GA); receive from the GA at least one magnetic field related value detected by one or more LF receiving devices disposed on the transmission pad; and perform position alignment between the transmission pad and the reception pad using the at least one magnetic field related value.

At least part of the transmitters may be disposed to arrange at least one magnetic field formed by the at least part of the transmitters in a 0°, 90°, 180°, or 270° direction with respect to at least one magnetic field formed by at least one part of the one or more LF receiving devices.

The one or more transmitters may include three or more LF antennas disposed on respective sides of the reception pad. The one or more transmitters may be disposed to arrange a longitudinal direction of a center the one or more transmitters to be parallel to a side of the transmission pad. A first transmitter among the one or more transmitters may be disposed on a side different from a side on which a second transmitter among the one or more transmitters is disposed, and the first transmitter may be disposed perpendicular to the second transmitter. The one or more transmitters and the one or more LF receiving devices may be disposed at points where a magnetic field formed by the reception coil of the reception pad or the transmission coil of the transmission pad is uniformly distributed. The transmitter or the LF receiving device may be a single-axis LF antenna. The transmitter or the LF receiving device may be a ferrite rod antenna.

According to the exemplary embodiments of the present disclosure, by accurately measuring the position of the vehicle using the LF signals, the primary coil of the ground assembly and the secondary coil of the electric vehicle may be more accurately aligned, thereby maximizing wireless charging efficiency.

BRIEF DESCRIPTION OF DRAWINGS

The present disclosure will become more apparent by describing in detail exemplary embodiments of the present disclosure with reference to the accompanying drawings, in which:

FIG. 24 is a flowchart illustrating a method for measuring a distance between a transmission pad and a reception pad according to an exemplary embodiment of the present disclosure.

Figure 1:
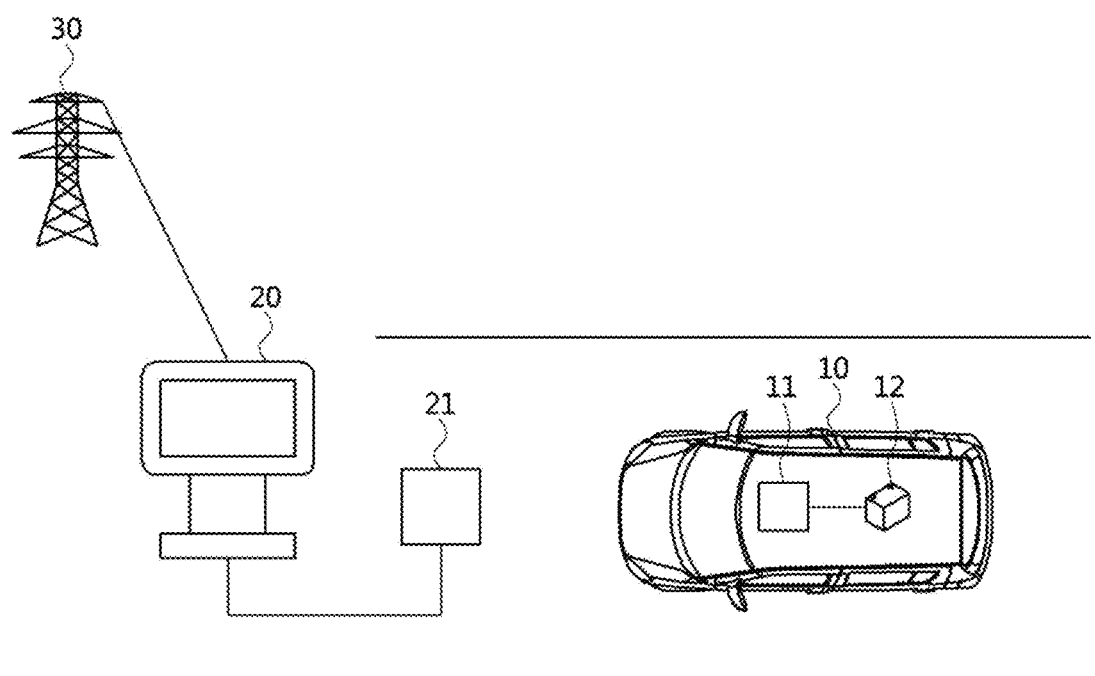
FIG. 1 is a conceptual diagram illustrating a concept of a wireless power transfer (WPT) to which exemplary embodiments of the present disclosure are applied.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about." Exemplary embodiments of the present disclosure are disclosed herein. However, specific structural and functional details disclosed herein are merely representative for purposes of describing exemplary embodiments of the present disclosure; however, exemplary embodiments of the present disclosure may be embodied in many alternate forms and should not be construed as limited to exemplary embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, the component may be directly or indirectly connected to the other component. In other words, for example, intervening components may be present. On the contrary, when a component is referred to as being "directly connected to" another component, there are no intervening components.

Terms are used herein only to describe the exemplary embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. Terms defined in dictionaries generally used are interpreted as including meanings identical to contextual meanings of the related art, unless definitely defined otherwise in the present specification, are not interpreted as being ideal or excessively formal meanings.

Additionally, one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, the below methods may be executed by an apparatus comprising the controller in conjunction with one or more other components, as would be appreciated by a person of ordinary skill in the art.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

According to exemplary embodiments of the present disclosure, an EV charging system may be defined as a system for charging a high-voltage battery mounted in an EV using power of an energy storage device or a power grid of a commercial power source. The EV charging system may have various forms according to the type of EV. For example, the EV charging system may be classified as a conductive-type using a charging cable or a non-contact wireless power transfer (WPT)-type (also referred to as an "inductive-type"). The power source may include a residential or public electrical service or a generator utilizing vehicle-mounted fuel, and the like.

Additional terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be a four or more wheeled vehicle manufactured for use primarily on public streets or roads.

The EV may include an electric vehicle, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An EV that recharges the on-vehicle primary battery by connecting to the power grid.

"Plug-in vehicle (PV)": An electric vehicle rechargeable via wireless charging from an electric vehicle supply equipment (EVSE) without using a physical plug or a physical socket.

"Heavy duty vehicle (H.D. Vehicle)": Any four-or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": The system for wireless power transfer and control between the GA and VA including alignment and communications. This system transfers energy from the electric supply network to the electric vehicle electromagnetically via a two-part loosely coupled transformer.

"Wireless power transfer (WPT)": The transfer of electrical power from the alternating current (AC) supply network to the electric vehicle without contact.

"Utility": A set of systems which supply electrical energy and may include a customer information system (CIS), an advanced metering infrastructure (AMI), rates and revenue system, etc. The utility may provide the EV with energy based on a rates table and discrete events. Additionally, the utility may provide information about certification of EVs, interval of power consumption measurements, and a tariff.

"Smart charging": A system in which EVSE and/or PEV communicate with power grid to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that may transfer power. The automatic charging may be performed after obtaining necessary authentication and right.

"Interoperability": A state in which components of a system interwork with corresponding components of the system to perform operations aimed by the system. Additionally, information interoperability may refer to capability that two or more networks, systems, devices, applications, or components may efficiently share and easily use information without causing inconvenience to users.

"Inductive charging system": A system transferring energy from a power source to an EV via a two-part gapped core transformer in which the two halves of the transformer, i.e., primary and secondary coils, are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly (GA)": An assembly on the infrastructure side consisting of the GA Coil, a power/frequency conversion unit and GA controller as well as the wiring from the grid and between each unit, filtering circuits, at least one housing, etc., necessary to function as the power source of a wireless power charging system. The GA may include the communication elements necessary for communication between the GA and the VA.

"Vehicle assembly (VA)": An assembly on the vehicle consisting of the VA Coil, rectifier/power conversion unit and VA controller as well as the wiring to the vehicle batteries and between each unit, filtering circuits, at least one housing, etc., necessary to function as the vehicle part of a wireless power charging system. The VA may include the communication elements necessary for communication between the VA and the GA. The GA may be referred to as a supply device, and the VA may be referred to as an EV device.

"Supply device": An apparatus which provides the contactless coupling to the EV device. In other words, the supply device may be an apparatus external to an EV. When the EV is receiving power, the supply device may operate as the source of the power to be transferred. The supply device may include the housing and all covers.

"EV device": An apparatus mounted on the EV which provides the contactless coupling to the supply device. In other words, the EV device may be installed in the EV. When the EV is receiving power, the EV device may transfer the power from the primary battery to the EV. The EV device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to control an output power level. The GA controller may be referred to as a supply power circuit (SPC), and the VA controller may be referred to as an electric vehicle (EV) power circuit (EVPC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA coil magnetic surface distance": the distance between the plane of the nearest magnetic or conducting component surface to the lower exterior surface of the VA coil when mounted. This distance includes any protective coverings and additional items that may be packaged in the VA coil enclosure. The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized when a fault occurs.

"Hazardous live component": A live component, which under certain conditions may generate a harmful electric shock.

"Live component": Any conductor or conductive component intended to be electrically energized in normal use.

"Direct contact": Contact of persons with live components. (See, IEC 61440.)

"Indirect contact": Contact of persons with exposed, conductive, and energized components made live by an insulation failure. (See, IEC 61140.)

"Alignment": A process of finding the relative position of supply device to EV device and/or finding the relative position of EV device to supply device for the efficient power transfer that is specified. In the present disclosure, the alignment may direct to a fine positioning of the wireless power transfer system.

"Pairing": A process by which a vehicle is correlated with a dedicated supply device, at which the vehicle is located and from which the power will be transferred. Pairing may include the process by which a VA controller and a GA controller of a charging spot are correlated. The correlation/association process may include the process of association of a relationship between two peer communication entities.

"High-level communication (HLC)": HLC is a special type of digital communication. HLC is necessary for additional services which are not covered by command and control communication. The data link of the HLC may use a power line communication (PLC), but the data link of the HLC is not limited to the PLC.

"Low-power excitation (LPE)": LPE refers to a technique of activating the supply device for the fine positioning and pairing so that the EV may detect the supply device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID distinguishes multiple wireless LANs. Therefore, all access points (APs) and all terminal/station devices that want to use a specific wireless LAN may use the same SSID. Devices that do not use a unique SSID are not able to join the BSS. Since the SSID is shown as plain text, the SSID may not provide any security features to the network.

"Extended service set identifier (ESSID)": ESSID is the name of the network to which one desires to connect. ESSID is similar to SSID but a more extended concept.

"Basic service set identifier (BSSID)": BSSID consisting of 48 bits is used to distinguish a specific BSS. With an infrastructure BSS network, the BSSID may be configured for medium access control (MAC) of the AP equipment. For an independent BSS or ad hoc network, the BSSID may be generated with any value.

The charging station may include at least one GA and at least one GA controller configured to manage the at least one GA. The GA may include at least one wireless communication device. The charging station may refer to a place or location having at least one GA, which is installed in home, office, public place, road, parking area, etc. According to exemplary embodiments of the present disclosure, "rapid charging" may refer to a method of directly converting AC power of a power system to direct current (DC) power, and supplying the converted DC power to a battery mounted on an EV. In particular, a voltage of the DC power may be DC 500 volts (V) or less.

According to exemplary embodiments of the present disclosure, "slow charging" may refer to a method of charging a battery mounted on an EV using AC power supplied to a general home or workplace. An outlet in each home or workplace, or an outlet disposed in a charging stand may provide the AC power, and a voltage of the AC power may be AC 220V or less. The EV may further include an on-board charger (OBC) configured to boost the AC power for the slow charging, convert the AC power to DC power, and supply the converted DC power to the battery.

According to exemplary embodiments of the present disclosure, a frequency tuning may be used for performance optimization. In particular, the frequency tuning may be performed by a supply device and may not be performed by an EV device. Additionally, all the supply devices may be required to provide the frequency tuning over a full range. An electric vehicle power controller (EVPC) may be configured to operate in a frequency range between about 81.38 kHz and 90.00 kHz. A nominal frequency (hereinafter, referred to as a target frequency, a design frequency, or a resonance frequency) for the magnetic field wireless power transfer (MF-WPT) may be about 85 kHz. The power supply circuits may provide the frequency tuning.

Hereinafter, exemplary embodiments of the present disclosure will be explained in detail by referring to accompanying figures.

FIG. 1 is a conceptual diagram illustrating a concept of a wireless power transfer (WPT) to which exemplary embodiments of the present disclosure are applied.

As shown in FIG. 1, a WPT may be performed by at least one component of an electric vehicle (EV) 10 and a charging station 20, and may be used for wirelessly transferring power to the EV 10. In particular, the EV 10 may be usually defined as a vehicle supplying an electric power stored in a rechargeable energy storage including a battery 12 as an energy source of an electric motor which is a power train system of the EV 10.

However, the EV 10 according to exemplary embodiments of the present disclosure may include a hybrid electric vehicle (HEV) having an electric motor and an internal combustion engine together, and may include an automobile and also a motorcycle, a cart, a scooter, and an electric bicycle. Additionally, the EV 10 may include a power reception pad 11 including a reception coil for charging the battery 12 wirelessly and may include a plug connection for conductively charging the battery 12. In particular, the EV 10 configured for conductively charging the battery 12 may be referred to as a plug-in electric vehicle (PEV).

Particularly, the charging station 20 may be connected to a power grid 30 or a power backbone, and provides an alternating current (AC) power or a direct current (DC) power to a power transmission pad 21 including a transmission coil via a power link. Additionally, the charging station 20 may be configured to communicate with an infrastructure management system or an infrastructure server that manages the power grid 30 or a power network via wired/wireless communications, and perform wireless communications with the EV 10. The wireless communications may be Bluetooth, ZigBee, cellular, wireless local area network (WLAN), or the like. For example, the charging station 20 may be located at various locations including a parking area attached to the house, a parking area for charging an EV at a gas station, a parking area at a shopping center or a workplace.

A process of wirelessly charging the battery 12 of the EV 10 may begin with first disposing the power reception pad 11 of the EV 10 in an energy field generated by the power transmission pad 21, and coupling the reception coil and the transmission coil with each other. An electromotive force may be induced in the power reception pad 11 as a result of the interaction or coupling, and the battery 12 may be charged by the induced electromotive force.

The charging station 20 and the transmission pad 21 may be referred to as a ground assembly (GA) in whole or in part, where the GA may refer to the previously defined meaning. All or part of the internal components and the reception pad 11 of the EV 10 may be referred to as a vehicle assembly (VA), in which the VA may refer to the previously defined meaning. The power transmission pad or the power reception pad may be configured to be non-polarized or polarized.

When a pad is non-polarized, one pole is disposed in a center of the pad and an opposite pole is disposed in an external periphery. In particular, a flux may be formed to exit from the center of the pad and return to external boundaries of the pad. When a pad is polarized, a respective pole may be disposed at either end portion of the pad. In particular, a magnetic flux may be formed based on an orientation of the pad. In the present disclosure, the transmission pad 21 or the reception pad 11 may collectively be referred to as a "wireless charging pad".

Figure 2:
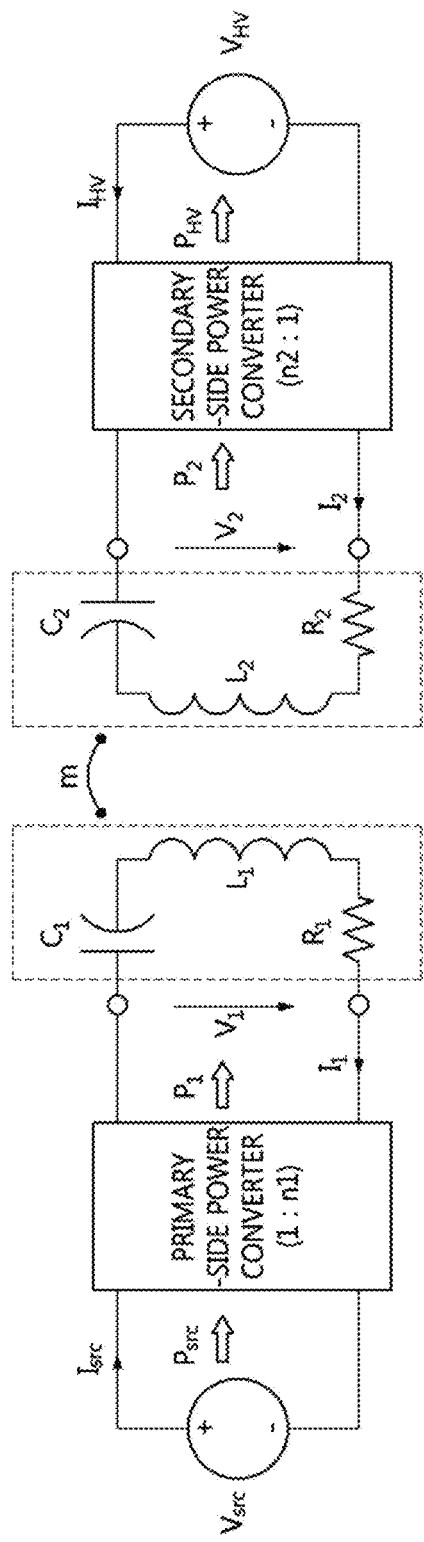
FIG. 2 is a conceptual diagram illustrating a WPT circuit according to exemplary embodiments of the present disclosure.

FIG. 2 is a conceptual diagram illustrating a WPT circuit according to exemplary embodiments of the present disclosure. As shown in FIG. 2, a schematic configuration of a circuit in which a WPT is performed in an EV WPT system is shown. The left side of FIG. 2 may be interpreted as expressing all or part of a power source $V_{src}$ (with current $I_{src}$) supplied from the power network, the charging station 20, and the transmission pad 21 in FIG. 1, and the right side of FIG. 2 may be interpreted as expressing all or part of the EV including the reception pad and the battery.

First, the left-side circuit of FIG. 2 may provide an output power $P_{src}$ that corresponds to the power source $V_{scr}$ supplied from the power network to a primary-side power converter. The primary-side power converter may be configured to supply an output power $P_1$ converted from the output power $P_{src}$ with frequency-converting and AC-to-DC/DC-to-AC converting to generate an electromagnetic field at a desired operating frequency in a transmission coil $L_1$.

Specifically, the primary-side power converter may include an AC/DC converter configured to convert the power $P_{src}$ which is an AC power supplied from the power network into a DC power, and a low-frequency (LF) converter configured to convert the DC power into an AC power having an operating frequency suitable for wireless charging. For example, the operating frequency for wireless charging may be determined to be within about 79 to 90 kHz.

The power $P_1$ output from the primary-side power converter may be supplied again to a circuit including the transmission coil $L_1$, a first capacitor $C_1$ and a first resistor $R_1$. In particular, a capacitance of the first capacitor $C_1$ may be determined as a value to have an operating frequency suitable for charging together with the transmission coil $L_1$. The first resistor $R_1$ may represent a power loss occurred by the transmission coil $L_1$ and the first capacitor $C_1$. Electrical potential or voltage $V_1$ occurs across a first node (connected to the first capacitor $C_1$ of the circuit) and a second node (connected to the first resistor $R_1$ of the circuit), and a current $I_1$ flows between the second node and the primary-side power converter.

Further, the transmission coil $L_1$ may be made to have electromagnetic coupling, which is defined by a coupling coefficient m, with the reception coil $L_2$ so that a power $P_2$ is transmitted, or the power $P_2$ is induced in the reception coil $L_2$. Therefore, the meaning of power transfer in the present disclosure may be used together with the meaning of power induction. Still further, the power $P_2$ induced in or transferred to the reception coil $L_2$ may be provided to a secondary-side power converter. Particularly, a capacitance of a second capacitor $C_2$ may be determined as a value having an operating frequency suitable for wireless charging together with the reception coil $L_2$, and a second resistor $R_2$ may represent a power loss occurring by the reception coil $L_2$ and the second capacitor $C_2$. Electrical potential or voltage $V_2$ occurs across a third node (connected to the second resistor $R_2$ of the circuit) and a fourth node (connected to the second capacitor $C_2$ of the circuit), and a current $I_2$ flows between the secondary-side power converter and the third node.

The secondary-side power converter may include an AC-to-DC converter configured to convert the supplied power $P_2$ of a specific operating frequency to a DC power having a voltage level suitable for a battery $V_{HV}$ (with current $I_{HV}$) of the EV. The electric power $P_{HV}$ converted from the power $P_2$ supplied to the secondary-side power converter may be output, and the power $P_{HV}$ may be used for charging the battery $V_{HV}$ disposed in the EV.

The right side circuit of FIG. 2 may further include a switch for selectively connecting or disconnecting the reception coil $L_2$ with the battery $V_{HV}$. In particular, resonance frequencies of the transmission coil $L_1$ and the reception coil $L_2$ may be similar or identical to each other, and the reception coil $L_2$ may be positioned near the electromagnetic field generated by the transmission coil $L_1$. The circuit of FIG. 2 should be understood as an illustrative circuit for WPT in the EV WPT system used for exemplary embodiments of the present disclosure, and is not limited to the circuit illustrated in FIG. 2.

On the other hand, since the power loss may increase as the transmission coil $L_1$ and the reception coil $L_2$ are separated by a predetermined distance, the relative positions of the transmission coil $L_1$ and the reception coil $L_2$ may be set. The transmission coil $L_1$ may be included in the transmission pad 21 in FIG. 1, and the reception coil $L_2$ may be included in the reception pad 11 in FIG. 1. Additionally, the transmission coil may be referred to as a GA coil, and the reception coil may be referred to as a VA coil. Therefore, position alignment between the transmission pad and the reception pad or position alignment between the EV and the transmission pad will be described below with reference to the drawings.

Figure 3:
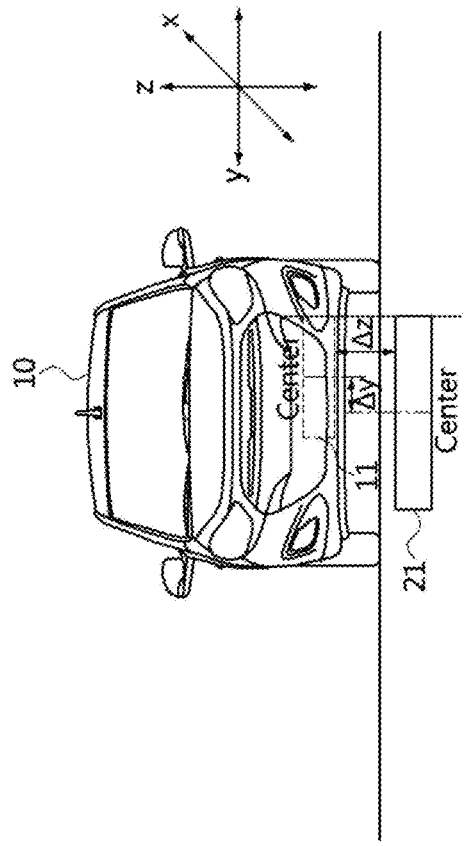
FIG. 3 is a conceptual diagram for explaining a concept of alignment in an EV WPT according to exemplary embodiments of the present disclosure.

FIG. 3 is a conceptual diagram for explaining a concept of alignment in an EV WPT according to exemplary embodiments of the present disclosure. As shown in FIG. 3, a method of aligning the power transmission pad 21 and the power reception pad 11 in the EV in FIG. 1 will be described. In particular, positional alignment may correspond to the alignment, which is the above-mentioned term, and thus may be defined as positional alignment between the GA and the VA, but is not limited to the alignment of the transmission pad and the reception pad. Although the transmission pad 21 is illustrated as positioned below a ground surface as shown in FIG. 3, the transmission pad 21 may also be positioned on the ground surface, or positioned to expose a top portion surface of the transmission pad 21 below the ground surface.

The reception pad 11 of the EV may be defined by different categories based on heights (defined in the z-direction) measured from the ground surface. For example, a class 1 for reception pads having a height of about 100-150 millimeters (mm) from the ground surface, a class 2 for reception pads having a height of about 140-210 mm, and a class 3 for reception pads having a height of about 170-250 mm may be defined. The reception pad may support a part of the above-described classes 1 to 3. For example, only the class 1 may be supported according to the type of the reception pad 11, or the class 1 and 2 may be supported according to the type of the reception pad 11. The height of the reception pad measured from the ground surface may correspond to the previously defined term "vehicle magnetic ground clearance." Further, the position of the power transmission pad 21 in the height direction (i.e., defined in the z-direction) may be determined to be disposed between the maximum class and the minimum class supported by the power reception pad 11. For example, when the reception pad supports only the class 1 and 2, the position of the power transmission pad 21 may be determined between about 100 and 210 mm with respect to the power reception pad 11. For example, a distance Δz may be measured between a top surface of the power transmission pad 21 and a bottom surface of the power reception pad 11.

In addition, a gap between the center of the power transmission pad 21 and the center of the power reception pad 11 may be determined to be disposed within the limits of the horizontal and vertical directions (defined in the x- and y-directions). For example, the gap (e.g., Δy) may be determined to be located within +75 mm in the horizontal direction (defined in the (+y)-direction or in the right direction perpendicular to the vehicle direction), and within ±100 mm in the vertical direction (defined in the (−x)-direction or in a vehicle travelling direction). The relative positions of the power transmission pad 21 and the power reception pad 11 may be varied in accordance with experimental results, and the numerical values should be understood as exemplary.

Although the alignment between the pads is described on the assumption that each of the transmission pad 21 and the reception pad 11 includes a coil, more specifically, the alignment between the pads may refer to the alignment between the transmission coil (or GA coil) and the reception coil (or VA coil) which are respectively included in the transmission pad 21 and the reception pad 11.

Meanwhile, to maximize charging efficiency during wireless charging to an EV (EV wireless charging), low-frequency (LF) signals may be used for alignment between the primary coil (i.e., GA coil) and the secondary coil (i.e., VA coil). The LF signal is a digitally modulated magnetic field that operates in a low frequency ITU radio band. An LF sensor may operate at a fixed frequency within a frequency range of 19 kHz to 300 kHz.

Figure 4:
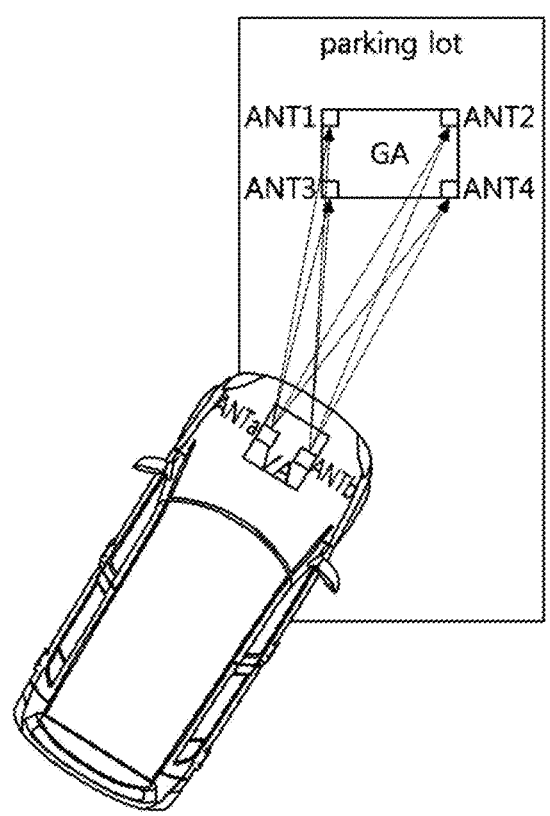
FIG. 4 is a conceptual diagram illustrating position alignment for wireless charging to which exemplary embodiments of the present disclosure are applied.

In addition, the magnetic field may be generated by at least two antennas located in the EV. The LF antennas in the EV may be located, for example, in the positions as shown in FIG. 4 below, without being limited by the exemplary embodiment. Additionally, the primary side device may include at least two magnetic sensors, wherein sensing elements of the magnetic sensor may be preferably arranged symmetrically. The magnetic sensors may be configured to measure a strength of the magnetic field in the x, y, and z directions.

Meanwhile, in the society of automotive engineers (SAE) standard meetings, considering autonomous driving technology, position alignment techniques using autonomous (or, automatic) parking or remote parking is being studied. Additionally, according to ISO 15118-8 that is an EV charging communication standard document, when wireless communication for charging an EV is used, communication between an electric vehicle communication controller (EVCC) and a supply equipment communication controller (SECC) conforms to the IEEE 802.11-2012. A required range of a distance between the EVCC and the SECC for a communication channel considered in the wireless communication is 5 m to 30 m for discovery, 10 cm to 5 m for fine positioning (fine alignment), and 5 cm to 5 m for charge control.

Particularly, the discovery is a step in which an EV searches for a charging pad, and the EVCC enters a communication region of at least one SECC and connects with an appropriate SECC. The fine positioning may refer to alignment between primary and EV devices (i.e., coils) for efficient power transfer via WPT, and alignment between connectors of the EV and an EVSE for power transfer when an automatic connection for conductive charging is employed. The charge control may be in form of, for example, a power request from the EV to the EVSE.

FIG. 4 is a conceptual diagram illustrating position alignment for wireless charging to which exemplary embodiments of the present disclosure are applied. As shown in FIG. 4, a position alignment method according to an exemplary embodiment of the present disclosure, which is a method for maximizing and/or optimizing the wireless charging efficiency by aligning a primary coil of a GA to a secondary coil of a VA, may be performed based on measurement of magnetic fields between four antennas ANT1, ANT2, ANT3 and ANT4 in the GA side (installed, for example, as part of a parking lot) and two antennas ANTa and ANTb in the VA side.

More specifically, the VA may include two antennas, and the two antennas may be disposed one by one (e.g., sequentially) in the left and right regions of the VA. The left and right regions may refer to regions divided into two halves of the VA, and may be left and right symmetrically separated regions. When the VA has a rectangular structure, the two antennas may be disposed at the center of the left side and the center of the right side respectively of the rectangular structure, but the structure is not limited to a rectangle because the structure may be changed according to a design selection.

Additionally, the two antennas may be disposed in a specific portion of the vehicle as connected with the VA, in which case they may be disposed one by one in the left and right regions of the specific portion of the vehicle. The left region and the right region of the specific portion of the vehicle may refer to symmetrically separated regions in the specific portion of the vehicle. Alternatively, instead of the left and right regions of the specific portion of the VA or the vehicle, a front region and a rear region of the specific portion of the VA or the vehicle may be used, but are not limited thereto. In other words, two regions that are symmetrically separated may be generally used. Hereinafter, the antennas are disposed in the VA.

The VA or a VA controller may include a position alignment apparatus configured to operate the antennas and calculate position difference information between the VA and the GA. The GA may include four antennas, and the four antennas may be disposed in a first region, a second region, a third region, and a fourth region of the GA, respectively, and the first, second, third, and fourth regions may refer to a upper left region, a upper right region, a lower left region, and a lower right region of the GA, respectively. However, exemplary embodiments of the present disclosure are not limited thereto, and may refer to regions divided from the GA into quadrants to have the same size.

When the GA has a rectangular structure, the four antennas may be disposed at each corner of the rectangular structure, but the structure is not limited to a rectangle because the structure may be changed according to a design selection. Additionally, the GA or a GA controller may also include a magnetic field detection apparatus configured to calculate magnetic field measurement values based on magnetic fields detected by the four antennas and transmitting the magnetic field measurement values to the position alignment apparatus.

Herein, the antenna included in the VA and/or GA may refer to a loop antenna or may refer to a ferrite rod antenna, but is not limited thereto. The ferrite rod antenna may be used in vehicles, portable radios, and aircraft due to its reduced size, have almost no reflection, and allow for good range control with a gentle reduction in the field strength. Additionally, the ferrite rod antenna may have a high penetration rate, require a low quiescent current according to a resonant frequency input stage, and may be less susceptible to detuning compared to high frequencies. However, since the ferrite rod antenna has a very high Q factor, the ferrite rod antenna may filter some of required signal modulation.

The ferrite rod antenna may refer to an antenna using an LF. A ferrite rod loop antenna may be thought of as a special case of conventional air-core loop antennas. The air-core loop antenna is synonymous with a solenoid. Thus, a magnetic field in the solenoid may be expressed on the basis of Ampere's law. However, since a medium inside a coil in the solenoid is air, if the inside medium is a ferrite rod, the ferrite rod, the medium inside the coil, should be reflected. In addition, considering the number of turns of the coil, the radius of the coil, the length of the coil, etc., the final magnetic field of the LF antenna (i.e., ferrite rod loop antenna) may be expressed by Equation 1 below.

$$B = \frac{\mu_o I N a^2}{2(a^2 + r^2)^{3/2}} \approx \frac{u_o I N a^2}{2r^3} [Tesla] \quad \text{Equation 1}$$

where $\mu_o$ = magnetic permeability
$I$ = Current [A]
$N$ = Number of turns
$a$ = radius of coil [m]
$r$ = distance from coil [m]

Meanwhile, the LF may refer to an LF band using a band of 30 to 300 kHz among 12 frequency ranges classified by International Telecommunication Union (ITU). Table 1 below shows the frequency ranges divided into 12 ranges in the ITU.

TABLE 1

|   | Abbreviation | Frequency range | Wave length range |
|---|---|---|---|
| 1 | ELF | 3~30 Hz | 100,000~10,000 km |
| 2 | SLF | 30~300 Hz | 10,000~1000 km |

TABLE 1-continued

|   | Abbreviation | Frequency range | Wave length range |
|---|---|---|---|
| 3 | ULF | 300~3000 Hz | 1000~100 km |
| 4 | VLF | 3~30 kHz | 100~10 km |
| 5 | LF | 30~300 kHz | 10~1 km |
| 6 | MF | 300~3000 kHz | 1000~100 m |
| 7 | HF | 3~30 MHz | 100~10 m |
| 8 | VHF | 30~300 MHz | 10~1 m |
| 9 | UHF | 300~3000 MHz | 1~0.1 m |
| 10 | SHF | 3~30 GHz | 100~10 mm |
| 11 | EHF | 30~300 GHz | 10~1 mm |
| 12 | THF | 300~3000 GHz | 1~0.1 mm |

The position alignment for wireless charging may be accomplished using LF signals and magnetic vectoring. The magnetic vectoring is a scheme of measuring a distance by detecting weak magnetic fields. For the magnetic vectoring, auxiliary coils are wound around three axes (X, Y, Z) on a transmission coil, and auxiliary coils are wound around two axes (X, Y) on a reception coil. In other words, the distance is measured by sensing the weak magnetic fields induced in the auxiliary coils.

Figure 5A:
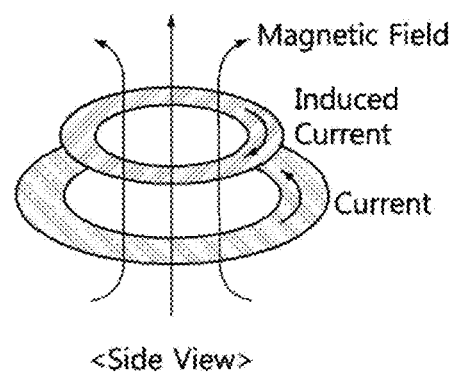
FIG. 5A is a perspective view illustrating magnetic fields of primary and secondary coils with a circular topology.
Figure 5B:
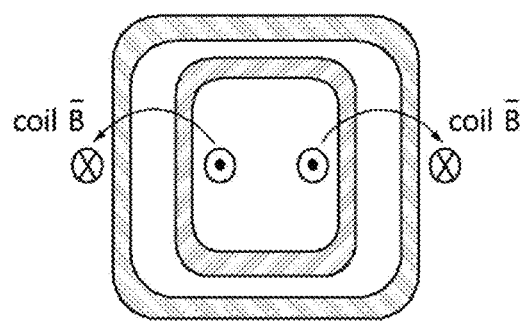
FIG. 5B is a top view illustrating magnetic fluxes of primary and secondary coils with a circular topology.

FIG. 5A is a perspective view illustrating magnetic fields of primary and secondary coils with a circular topology, and FIG. 5B is a top view illustrating magnetic fluxes of primary and secondary coils with a circular topology.

Figure 6A:
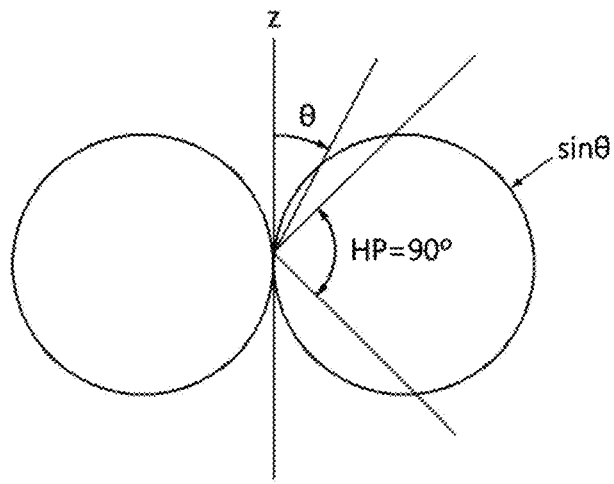
FIGS. 6A to 6C are diagrams illustrating radiation patterns of a conventional LF antenna.
Figure 6B:
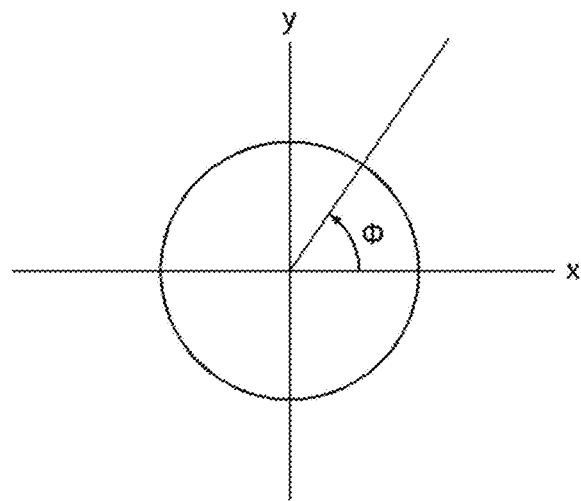
Figure 6C:
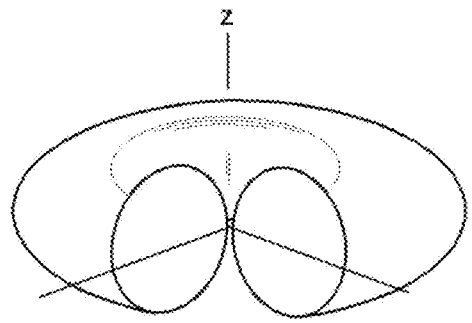

FIGS. 6A to 6C are diagrams illustrating radiation patterns of a conventional LF antenna. As shown in FIGS. 6A to 6C, a typical LF antenna has an omnidirectional radiation pattern similar to a small loop antenna, which is the same as that of a small dipole antenna. Particularly, the omnidirectional radiation pattern may correspond with a state in which the antenna is capable of receiving signals from multiple directions. The sin Θ pattern shown in FIG. 6B has an omnidirectional radiation pattern for all azimuth angles Φ, and becomes a torus-shaped radiation pattern in three dimensions as shown in FIG. 6C.

In the LF antenna, a null of the radiation pattern is located in the axis of the coil. A frequently used parameter for representing the radiation pattern is a half-power beamwidth (HPBW), which is an angle between two directions where a radiation intensity becomes half the maximum power of the beam (i.e., half the field strength) in a plane with the maximum of the antenna beam. For the LF antennas, this angle may be 90°.

The omnidirectional radiation pattern may be useful when a source and a direction of the signal are unknown or difficult to predict. While much of the information regarding the direction is lost, tracking of the antenna beam may be used to estimate an origin of the signal by analyzing a pointing vector path associated with electromagnetic waves. A magnetic flux density for the omnidirectional radiation pattern may be expressed by Equation 2 below.

$$B = B_0 \sin \omega t = \mu_r \mu_0 H_0 \sin \omega t \quad \text{Equation 2}$$

Meanwhile, recent experiments have reported that precise alignment is difficult when LF signals and magnetic vectoring are used in the EV wireless charging.

Figure 7:
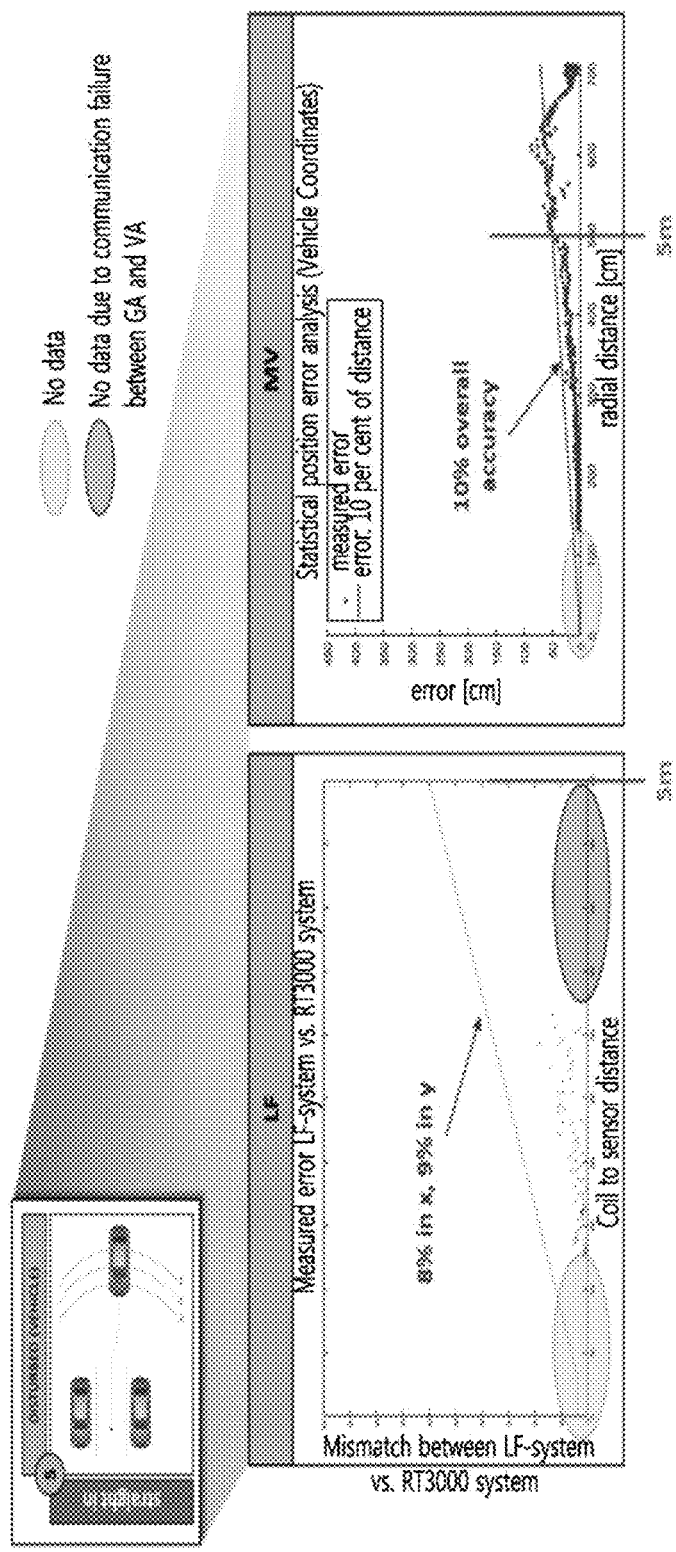
FIG. 7 is a diagram illustrating an error occurring when aligning positions using LF signals or magnetic vectoring.

FIG. 7 is a diagram illustrating an error occurring when aligning positions using LF signals or magnetic vectoring. A result shown in FIG. 7 is a result of aligning positions by using four LF antennas or LF sensors in a transmission coil and two LF antennas or LF sensors in a reception coil as defined in the IEC 61980-2 TS standard document. The result shown in FIG. 7 indicates that position-related data is unable to be obtained when a distance between the transmission coil and the reception coil is very near. In other words, confirmation may be made that precise alignment is difficult when aligning the positions using the LF signals and the magnetic vectoring.

This is most likely due to the use of a weak magnetic field with magnetic field strength of tens of nT, which is used when measuring the distance using the LF signals or the magnetic field strengths of the auxiliary coils for the magnetic vectoring. In other words, when using the weak magnetic fields, if the distance between the transmission coil and the reception coil is very near (e.g., 0 to 0.5 m), the weak magnetic field differences between the auxiliary coils (or auxiliary antennas) of the transmission coil and the auxiliary coils (or auxiliary antennas) of the reception coil becomes difficult to be distinguished, so that accurately determining the distance between the transmission coil and the reception coil is difficult.

In the specification of the standard document, the auxiliary coil (or auxiliary antenna) used when aligning the positions using the LF signals is represented only by the LF antenna or the LF sensor, and the specification of the standard document does not specify what type of LF antenna or LF sensor is used. From these facts, the following conclusions are drawn.

When aligning positions by using LF signals or LF antennas, the magnetic field direction of the power transmission coil for EV wireless charging and the radiation characteristic of the LF antennas should be taken into consideration to precisely obtain information on the position even at a very near distance (e.g., 0 to 0.5 m). Therefore, the LF antenna with a structure having a directional radiation pattern instead of the omnidirectional radiation pattern of the typical LF antenna is suitable for position alignment for the EV wireless charging.

Additionally, according to the IEC 61980-2 TS standard document, four LF antennas or LF sensors are positioned at a transmission coil, and two LF antennas or LF sensors are positioned at a reception coil to determine position information using weak magnetic fields. However, with such structure according to the IEC 61980-2 TS standard document, there is a difficulty in determining the position at a very near distance. Therefore, with such structure, antennas are necessarily specified and placed in the transmission coil and the reception coil, respectively, by specifying LF transmitters for transmitting the LF magnetic fields and LF receiving antennas or LF sensors for receiving the LF magnetic fields. If necessary, the number of antennas are necessarily specified and arranged in the transmission coil and the reception coil.

Accordingly, the present disclosure proposes a method for enabling precise alignment at a very near distance (e.g. 0 to 0.5 m) when aligning the positions using the LF signals for EV wireless charging. More specifically, the present disclosure proposes arrangements of the antennas and the sensors, which maintain the conventional alignment scheme using the LF signals for EV wireless charging but do not reduce the efficiency, and a method for enabling the LF receiving antennas of the transmission coil to selectively receive the omnidirectional magnetic fields of the LF transmitter of the reception coil via the arrangements of the LF receiving antennas of the transmission coil and the LF transmitters of the reception coil.

Before deriving a solution to the problem with the difficulty of recognizing the position at the very near distance (e.g., 0 to 0.5 m), to identify whether the conventional arrangement of LF antennas is suitable, electromagnetic (EM) simulation and actual vehicle tests were conducted on the arrangement of LF antennas and sensors in the transmitting and reception coils proposed in the existing standard document.

Figure 8A:
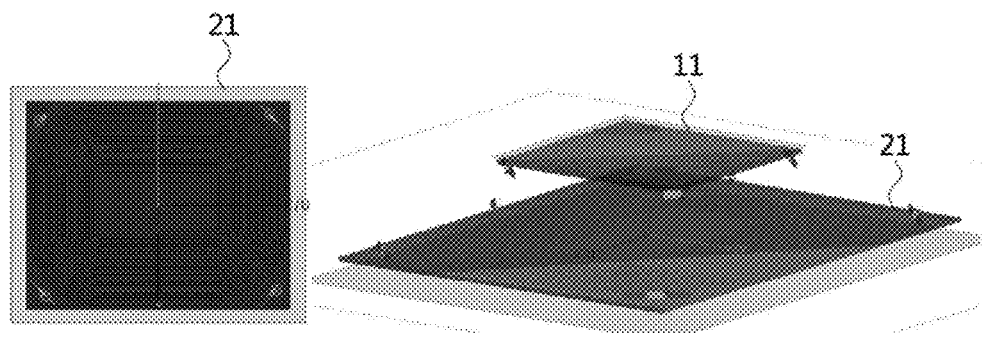
FIGS. 8A and 8B illustrate a conventional arrangement of LF antennas according to the related art.
Figure 8B:
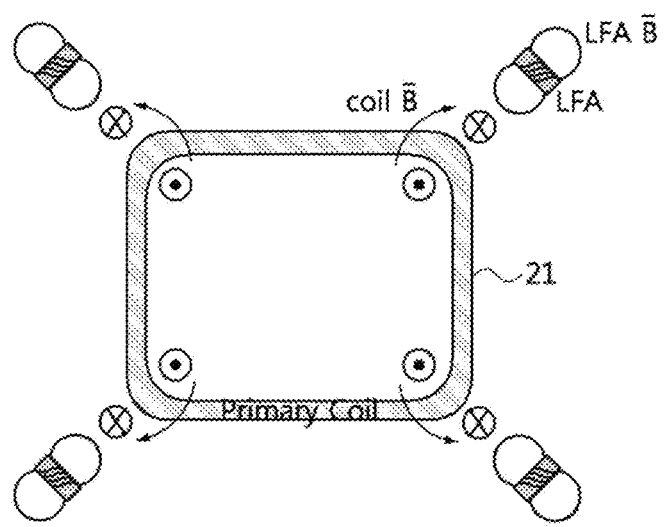

FIGS. 8A and 8B illustrate a conventional arrangement of LF antennas. In the present disclosure, an entity that initiates the position alignment is not a transmission coil side that transfers wireless power but a reception coil side that receives the power, i.e., a vehicle. To perform the position alignment according to the present disclosure, a signal indicating that alignment is initiated should be transmitted by the vehicle side to the transmission coil. Accordingly, LF transmitters are mounted on the reception coil of the vehicle, and LF receiving antennas or LF sensors are mounted on the transmission coil of the infrastructure.

FIG. 8A is a diagram illustrating a structure in which four LF receiving antennas are mounted at the respective corners of the transmission coil. FIG. 8B is a diagram conceptually illustrating the structure in which four LF receiving antennas are mounted at the respective corners of the transmission coil. The arrangement structure of the LF antennas shown in FIGS. 8A and 8B is a general structure defined in the related standard.

Additionally, the mounting positions of the LF antennas should be determined by taking into account the magnetic field direction of the coil used for power transfer. The simulation results of FIGS. 9A to 9C, which will be described below, demonstrate the change in charging efficiency when the transmission coil and the reception coil have the LF antennas. Based on these, the mounting positions of the LF antennas may be determined.

Figure 9A:
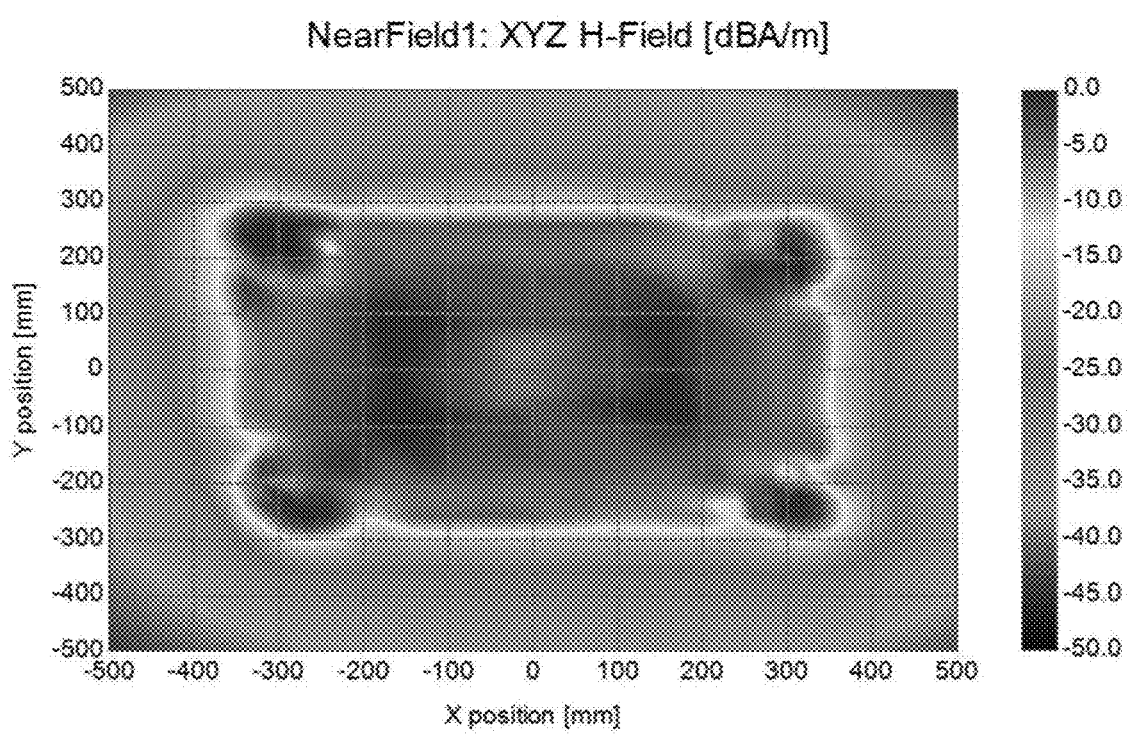
FIGS. 9A to 9C are diagrams illustrating shapes of magnetic fields in a conventional LF antenna arrangement according to the related art.
Figure 9B:
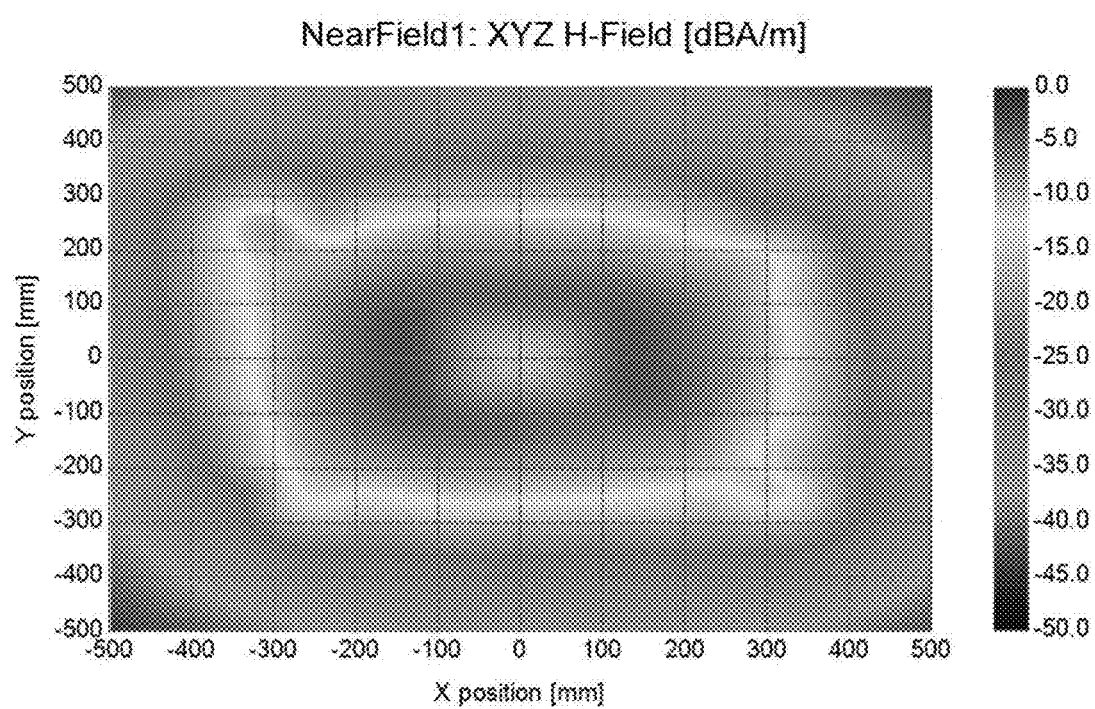
Figure 9C:
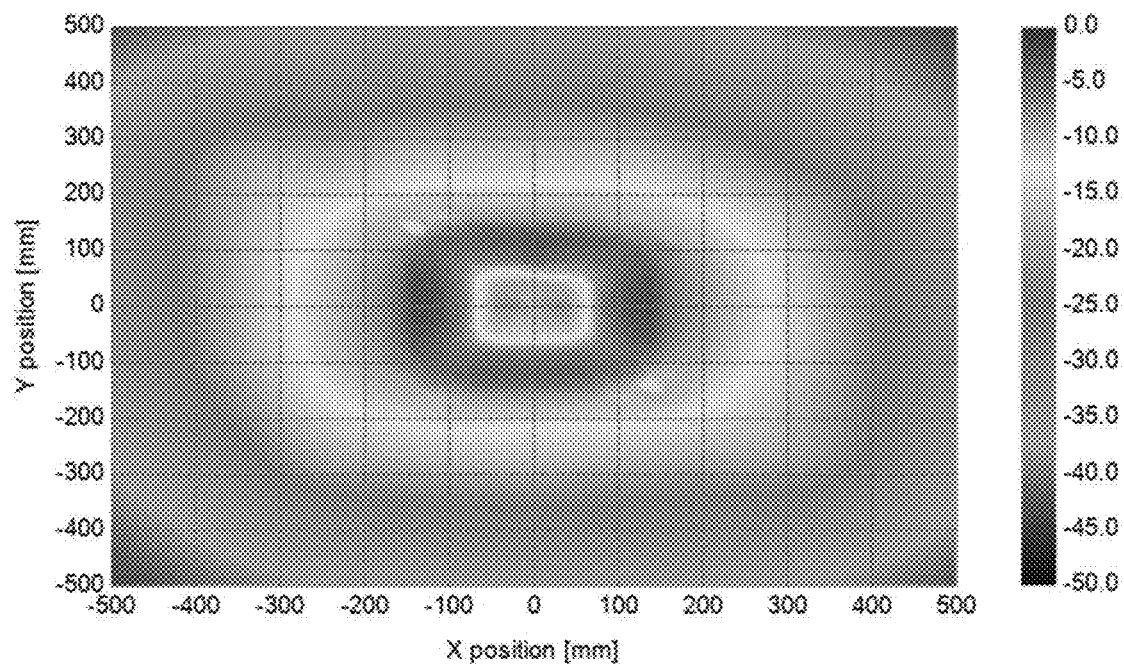

FIGS. 9A to 9C are diagrams illustrating shapes of magnetic fields in a conventional LF antenna arrangement. FIG. 9A illustrates a magnetic flux density of the magnetic field of the transmission coil during power transfer, FIG. 9B illustrates a magnetic flux density of the magnetic field between the transmitting and reception coils during power transfer, and FIG. 9C illustrates a magnetic flux density of the magnetic field of the reception coil during power transfer.

From FIGS. 9A to 9C, when the LF antennas are mounted at the corners of the transmission coil, the magnetic flux density is distributed due to the influence of the LF antennas during power transfer. In other words, damage occurs by sin 45° in the magnetic flux density. Additionally, some blind spots occur in the reception coil of FIG. 9C.

Looking at the experimental results, to prevent reduction of the charging efficiency during EV wireless charging, the LF receiving antennas may be disposed in the transmission coil and the LF transmitters may be disposed in the reception coil. To arrange the LF receiving antennas of the transmission coil so that the magnetic field for power transfer is not affected, the LF antennas may be arranged at points where the magnetic field is uniformly distributed on each side of the rectangular transmission coil. This is an arrangement considering that the shape of the transmitting and reception coils in the standard document is rectangular. If the transmitting and reception coils are not rectangular, the LF antennas should be provided at the points where the magnetic field is uniformly distributed in the transmission coil.

In addition, as described above, the structure and arrangement of the LF antennas proposed in the current standard are unable to distinguish the LF transmitters of the reception coil at a very near distance because the LF receiving antennas or the LF sensors of the transmission coil receive all magnetic field values. Accordingly, with the arrangement of the LF receiving antennas of the transmission coil and the LF transmitters of the reception coil according to the present disclosure, the LF receiving antennas of the transmission coil may be configured to selectively receive the omnidirectional magnetic field for position alignment from the LF transmitters of the reception coil.

In summary, the present disclosure proposes a method for configuring the LF antennas disposed and arranged in the transmitting and reception coils, which perform position alignment using LF signals even at a short distance (e.g., 0 to 0.5 m). The LF receiving antennas should be disposed on the transmission coil, and the LF transmitters should be disposed on the reception coil, but affecting the magnetic field associated with the power transfer should be avoided. Therefore, when the LF antennas are disposed, the LF antennas may be disposed at the points where the magnetic field by the transmission coil is uniformly distributed in the transmission coil.

Accordingly, in the present disclosure, instead of arranging all the LF antennas in the same direction, some LF antennas may be arranged by switching 90°. Thus, the LF receiving antennas of the transmission coil may selectively receive the magnetic fields from the LF transmitters of the reception coil.

Figure 10A:
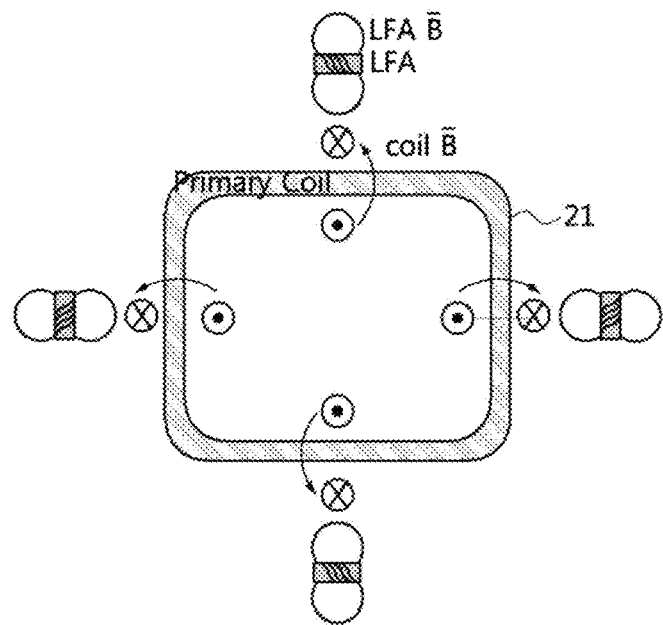
FIGS. 10A and 10B are diagrams illustrating an arrangement structure of LF antennas according to an exemplary embodiment of the present disclosure.
Figure 10B:
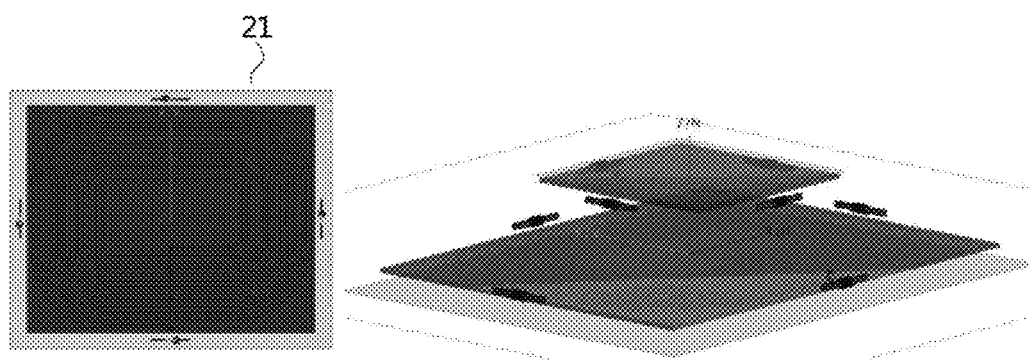

FIGS. 10A and 10B are diagrams illustrating an arrangement structure of LF antennas according to an exemplary embodiment of the present disclosure. In the present disclosure, when the LF receiving antennas for position alignment are disposed on the transmission coil in charge of power transfer, they may arranged to not affect the magnetic field for power transfer. In other words, according to an exemplary embodiment of the present disclosure, as shown in FIG. 10A, the LF antennas may be disposed at the points where the magnetic field is uniformly distributed on each side of the transmission coil, which has a quadrangle shape defined in international standard specifications for EV wireless charging.

FIG. 10A illustrates conceptually a structure in which four LF receiving antennas are arranged on each side of the transmission coil 21. FIG. 10B illustrates a structure in which four LF receiving antennas are mounted on each side of the transmission coil 21.

Figure 11A:
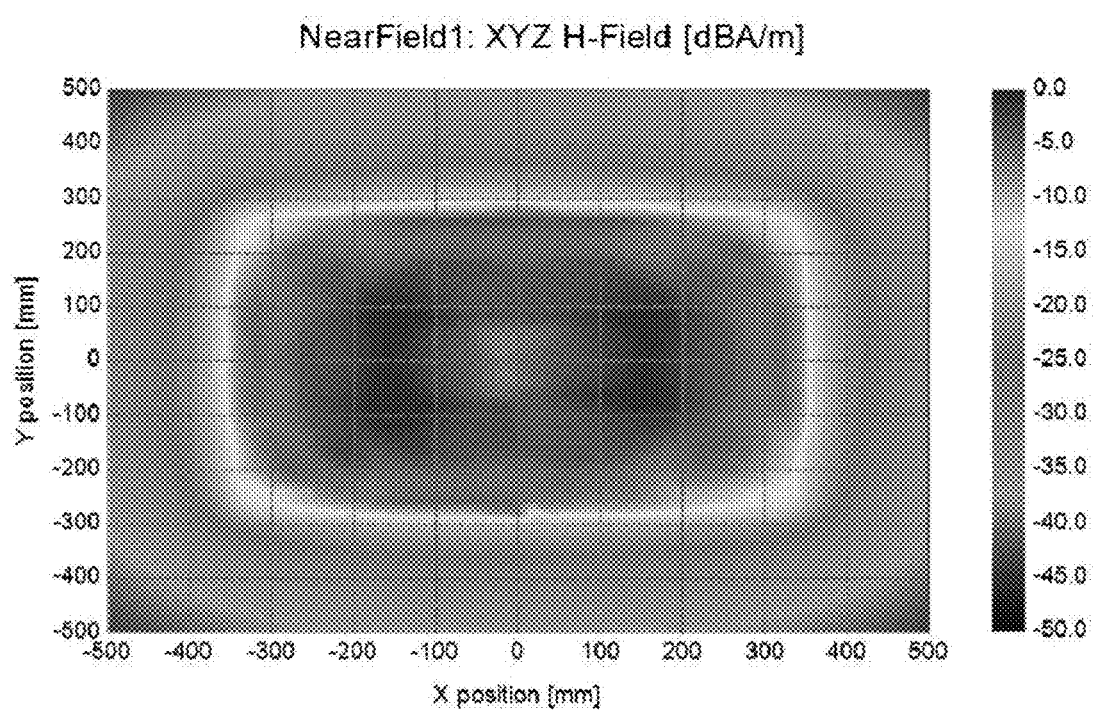
FIGS. 11A to 11C, inclusive, are diagrams illustrating shapes of magnetic fields in a LF receiving antenna arrangement according to an exemplary embodiment of the present disclosure.
Figure 11B:
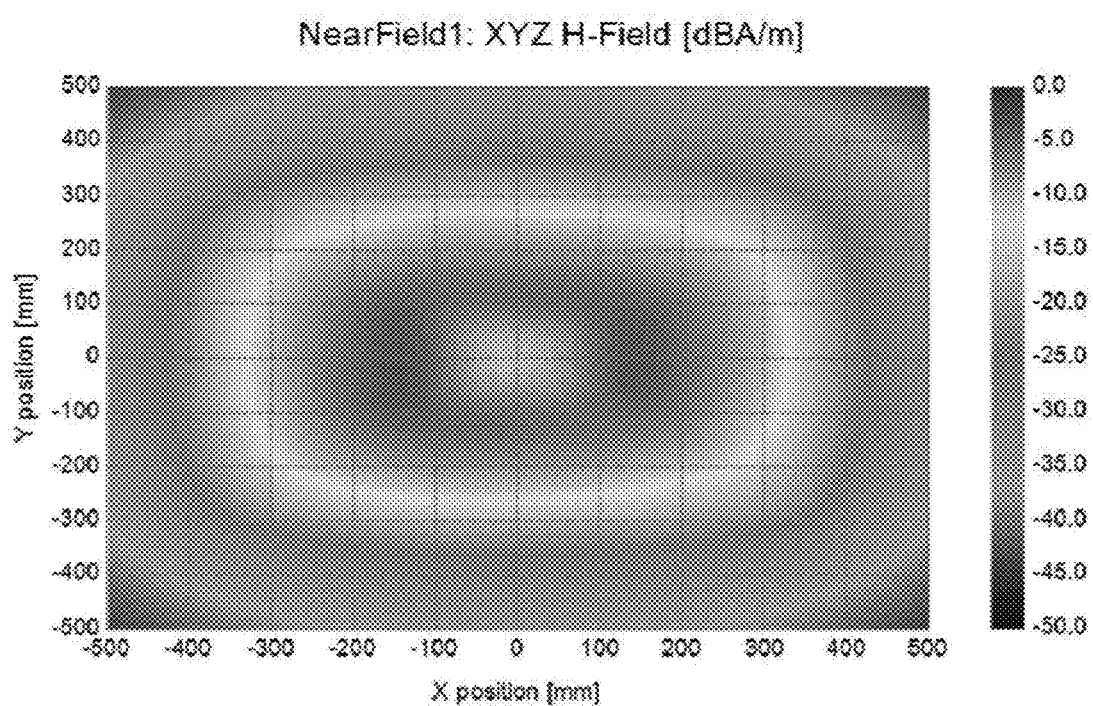
Figure 11C:
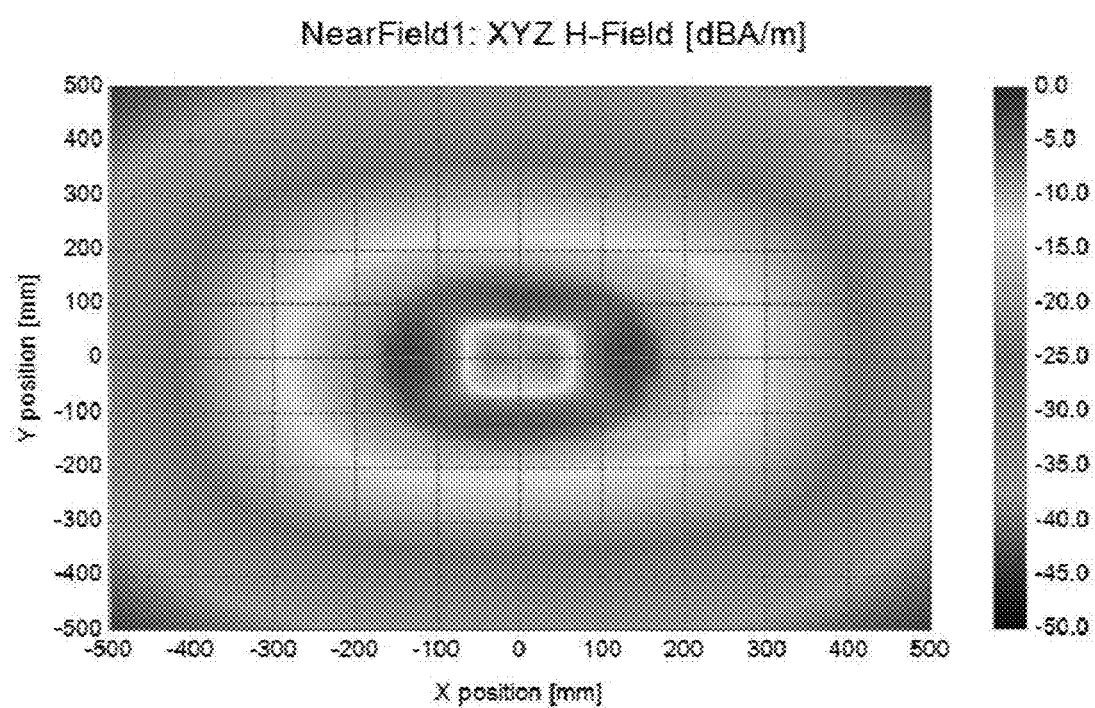

FIGS. 11A to 11C are diagrams illustrating shapes of magnetic fields in a LF receiving antenna arrangement according to an exemplary embodiment of the present disclosure. FIG. 11A illustrates a magnetic field of a transmission coil during power transfer in an LF receiving antenna arrangement structure (i.e., the LF receiving antenna arrangement structure of FIGS. 10A and 10B) according to an exemplary embodiment of the present disclosure. Similarly, FIG. 11B illustrates a magnetic field between the transmitting and reception coils during power transfer, and FIG. 11C illustrates a magnetic flux density of the reception coil during power transfer as separated by colors.

Once the arrangement of the LF receiving antennas in the transmission coil has been determined, the arrangement of the LF transmitters is determined in the reception coil. The HPBW of the LF antenna has the characteristics of sin Θ, and the magnetic flux density for the LF antenna also has a sine component. To maximize the magnetic field characteristics of the LF antenna, the LF transmitters of the reception coil are arranged so that the magnetic field direction of the reception coil has an angle of 0°, 90°, 180°, or 270° with respect to the magnetic field direction of the LF receiving antenna mounted on the transmission coil.

Figure 12A:
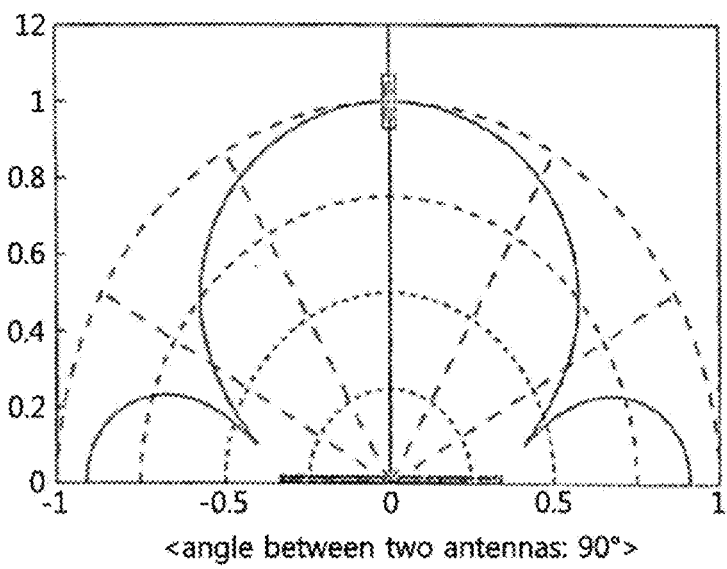
FIGS. 12A to 12D, inclusive, are diagrams illustrating magnetic field radiation patterns according to angles between two LF antennas according to an exemplary embodiment of the present disclosure.
Figure 12B:
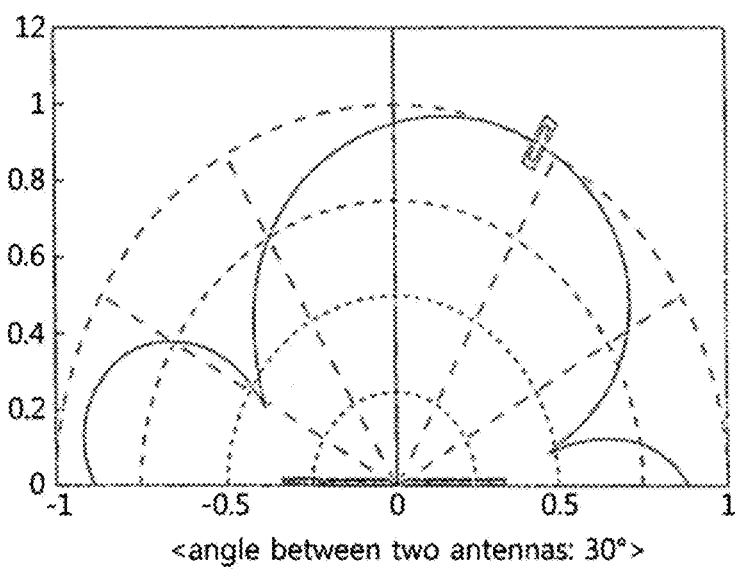
Figure 12C:
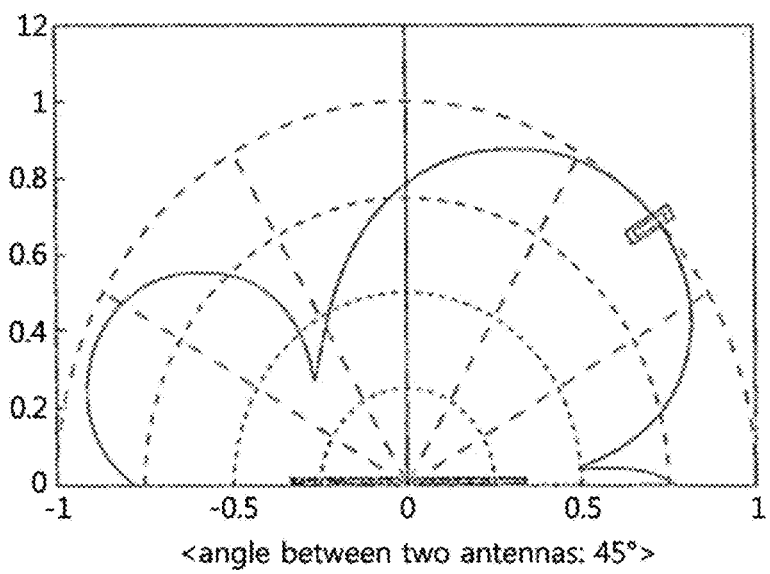
Figure 12D:
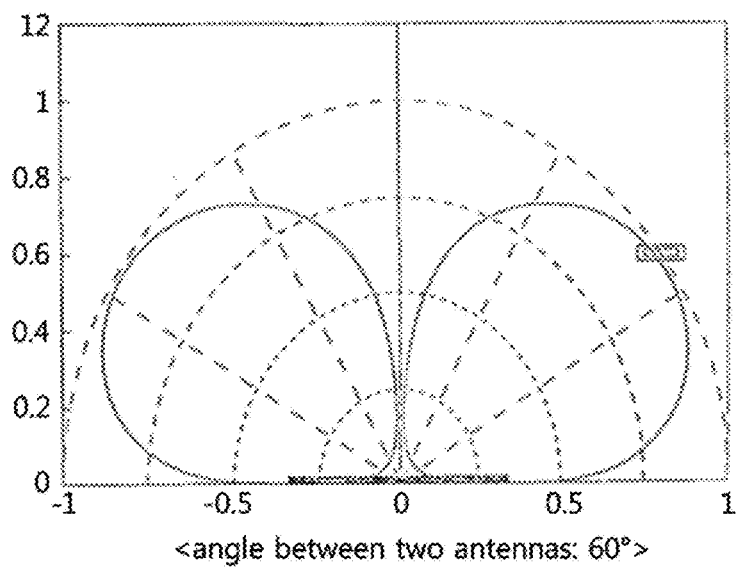

FIGS. 12A to 12D are diagrams illustrating magnetic field radiation patterns according to angles between two LF antennas. FIG. 12A illustrates a radiation pattern when the angle between two antennas is 90°, FIG. 12B illustrates a radiation pattern when the angle between two antennas is 30°, FIG. 12C illustrates a radiation pattern when the angle between two antennas is 45°, and FIG. 12D illustrates a radiation pattern when the angle between two antennas is 60°. In particular, one of the two antennas is an LF transmitter, and the other is an LF receiving antenna.

Figure 13A:
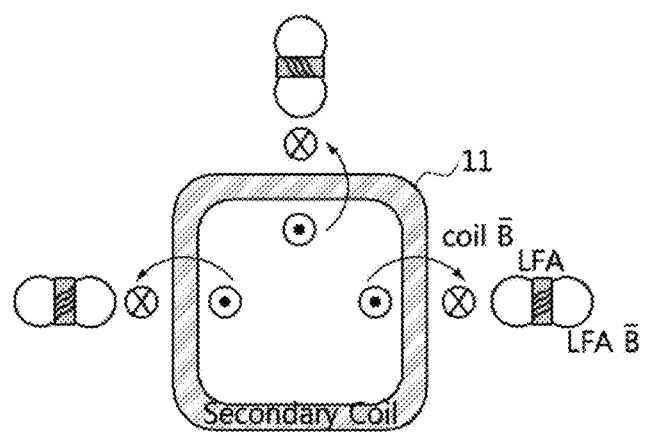
FIGS. 13A and 13B are diagrams illustrating an arrangement structure of LF transmitters in a reception coil according to an exemplary embodiment of the present disclosure.
Figure 13B:
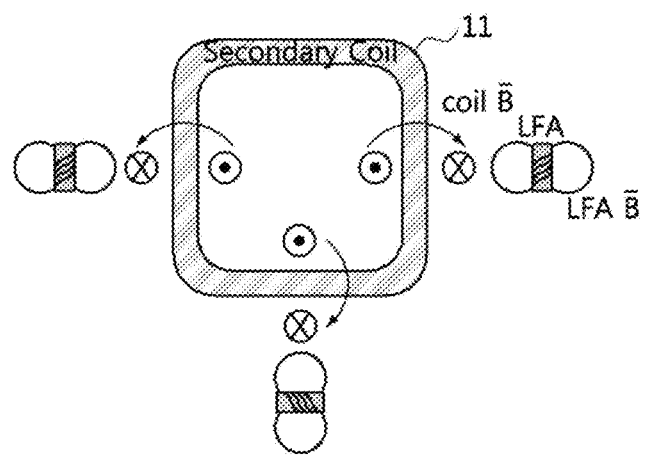

FIGS. 13A and 13B are diagrams illustrating an arrangement structure of LF transmitters in a reception coil according to an exemplary embodiment of the present disclosure. As described above, the LF signals may not be recognized since the reception coil starts to approach the transmission coil very close. To be able to recognize the weak magnetic field more reliably, each LF transmitter of the reception coil needs to transmit the magnetic field in a direction different from those of other transmitters. Accordingly, the present disclosure proposes a scheme of adding one more LF transmitter in the reception coil and arranging the one more LF transmitter in a direction perpendicular to the existing LF transmitter. This arrangement scheme may be identified with two arrangement examples of the LF transmitters shown in FIGS. 13A and 13B.

In particular, since the direction of the added LF transmitter in the reception coil and the direction of the LF receiving antenna of the transmission coil are the same, the LF receiving antenna of the transmission coil may not effectively detect the magnetic field emitted from the added LF transmitter of the reception coil at a long distance. However, since the LF receiving antennas of the transmission coil may sense the magnetic fields emitted by the other two LF transmitters of the reception coil, the problem may not be serious. In addition, when the reception coil 11 approaches the transmission coil, the magnetic field of the added LF transmitter of the reception coil may be detected by the LF receiving antenna of the transmission coil.

FIGS. 14A to 14D are diagrams illustrating arrangement structures of LF transmitters and LF receiving antennas according to exemplary embodiments of the present disclosure. FIGS. 14A to 14D illustrate examples in which the arrangement of the LF transmitters and the arrangement of the LF receivers are considered together. In the exemplary embodiments of FIGS. 14A to 14D, the LF the LF transmitter is a LF transmitting antenna and LF receiver relates is a LF receiving antenna. Further, 3 LF receiving antennas may be arranged in the transmission coil 21. Additionally, 3 transmitting antennas may also be arranged in the reception coil 11.

In other words, at least one receiving antenna may include three or more LF antennas each of which is disposed on a side of the transmission coil, and each receiving antenna may be disposed such that the longitudinal direction of the center of each receiving antenna is parallel to the side where the corresponding receiving antenna is disposed. Additionally, the first receiving antenna of the at least one receiving antenna may be disposed on a side different from a side where the second receiving antenna of the at least one receiving antenna is disposed, and the first receiving antenna and the second receiving antenna may be disposed perpendicular to each other. A first LF receiving device among the one or more LF receiving devices may be disposed on a side different from a side on which a third LF receiving device among the one or more LF receiving devices is disposed, and the first LF receiving device may be disposed parallel to the third LF receiving device.

At least one transmitter may include at least three or more LF antennas each of which is disposed at a side of the reception coil, and each transmitter may be disposed such that the longitudinal direction of the center of each transmitter is parallel to the side where the corresponding transmitter is located. Among the at least one transmitter, the first transmitter may be positioned on a side different from a side where the second transmitter is located, and the first transmitter and the second transmitter may be disposed perpendicular to each other. A first transmitter among the one or more transmitters may be disposed on a side different from a side on which a third transmitter among the one or more transmitters is disposed, and the first transmitter may be disposed parallel to the third transmitter. In particular, the at least one transmitter and the at least one receiving antenna may be preferably arranged such that the magnetic fields are formed in a 0°, 90°, 180°, or 270° direction with each other.

Meanwhile, among various positioning technologies, a method using Received Signal Strength Intensity (RSSI) may be used as a representative positioning technology that may be used for LF signals for EV wireless charging alignment. Distance measurement based on RSSI may be expressed according to Equation 3 below.

$$d = 10^{\frac{-RSSI + A_r}{10^n}} \text{ or}$$
$$d = \frac{\lambda}{4\pi} \cdot 10^{\frac{L}{20}} = \frac{c}{4\pi f} \cdot 10^{\frac{L}{20}}$$

Equation 3 wherein, d denotes a distance, n denotes a signal propagation constant, and $A_r$ denotes a RSSI value per meter. Further, $\lambda$ denotes a wavelength of propagation, c denotes a speed of propagation, f denotes a frequency of radio wave, and L denotes propagation path loss (transmitting signal strength–received signal strength).

To recognize a three-dimensional coordinate from RSSI, recognition of at least four signals may be necessary. Since three LF transmitters are arranged in the reception coil, four LF receiving antennas may not be necessary in the transmission coil, and one LF receiving antenna may be omitted. Additionally, like the LF transmitter of the reception coil, one of the LF receiving antennas of the transmission coil needs to be disposed at a right angle of 90° with the other LF receiving antenna. The arrangements considering both the LF receiving antennas of the transmission coil and the LF transmitters of the reception coil are shown in FIGS. 14A to 14D.

Figure 15:
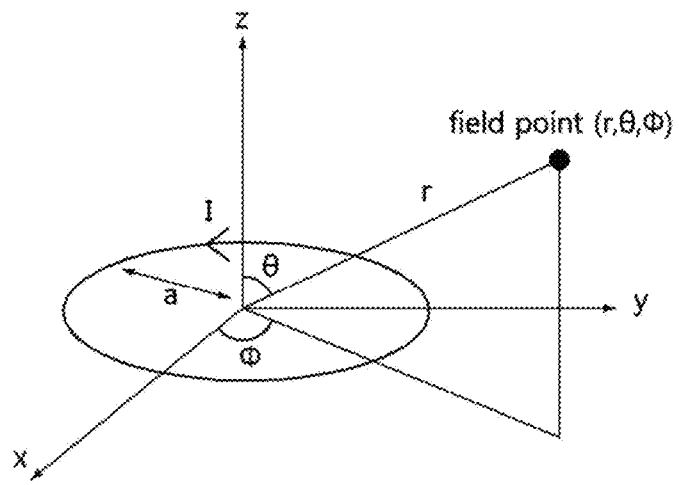
FIG. 15 is a diagram illustrating a concept of magnetic flux density in a general magnetic field according to the related art.

Hereinafter, a method of measuring a distance by analyzing a magnetic field in position alignment using LF signals will be described. FIG. 15 is a diagram illustrating a concept of magnetic flux density in a general magnetic field. A vector magnetic potential A and magnetic flux density B at a field point (r, θ, φ) in a general spatial coordinate system represented by (x, y, z) may be expressed by Equation 4 below.

$$A = \frac{\mu_0}{4\pi} \frac{m \times \hat{a}_r}{r^2} = \hat{a}_\phi \frac{\mu_0}{4\pi} \frac{m}{r^2} \sin\theta$$
$$B = \nabla \times A = \frac{\mu_0}{4\pi} \frac{m}{r^3} (\hat{a}_r 2\cos\theta + \hat{a}_\theta \sin\theta)$$

In general, when a magnetic flux density expressed in a spherical coordinate system is converted into a rectangular coordinate system, the magnetic flux density may be expressed as Equation 5 below.

$$\begin{pmatrix} A_x \\ A_y \\ A_z \end{pmatrix} = \begin{pmatrix} \sin\theta\cos\phi & \cos\theta\cos\phi & -\sin\phi \\ \sin\theta\sin\phi & \cos\theta\sin\phi & \cos\phi \\ \cos\theta & -\sin\theta & 0 \end{pmatrix}$$

Equation 5

$$\begin{pmatrix} A_r \\ A_\theta \\ A_\phi \end{pmatrix} \Rightarrow \begin{matrix} A_x = A_r\sin\theta\cos\phi + A_\theta\cos\theta\cos\phi - A_\phi\sin\phi \\ A_y = A_r\sin\theta\sin\phi + A_\theta\cos\theta\sin\phi + A_\phi\cos\phi \\ A_z = A_r\cos\theta - A_\theta\sin\theta \end{matrix}$$

By converting this to a general formula, the following equation is derived.

$$\vec{B} = \frac{\mu_0 m}{4\pi R^3} \{ (2\cos\theta\sin\theta\cos\varphi + \sin\theta\cos\theta\cos\varphi + 0)\vec{X} + (2\cos\theta\sin\theta\sin\varphi + \sin\theta\cos\theta\sin\varphi + 0)\vec{Y} + (2\cos\theta^2 - \sin\theta^2)\vec{Z} \}$$

Figure 16:
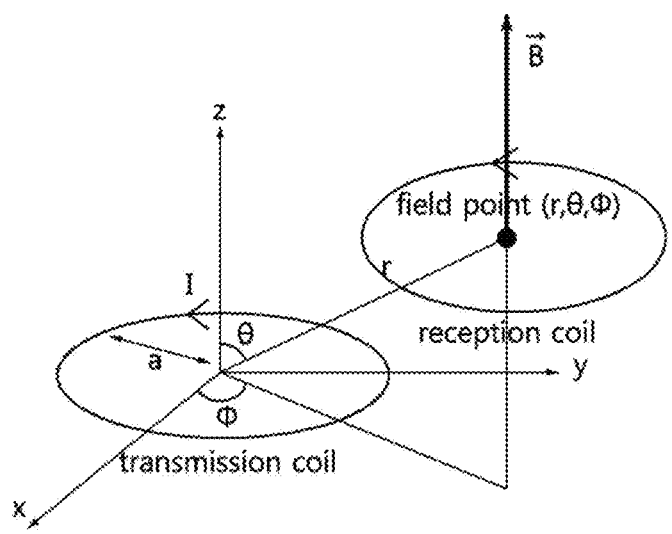
FIG. 16 is a diagram illustrating a concept of magnetic flux density in an LF antenna used for EV wireless charging to which exemplary embodiments of the present disclosure are applied.

FIG. 16 is a diagram illustrating a concept of magnetic flux density in an LF antenna used for EV wireless charging to which exemplary embodiments of the present disclosure are applied. If the LF antenna of the transmission coil and the LF antenna of the reception coil are located on the same X and Y axes, the alignment is completed and the magnetic flux density may be expressed by considering only the Z axis as shown in Equation 6 below.

$$\vec{B}_z = \frac{\mu_0 m}{4\pi R^3} (2\cos\theta^2 - \sin\theta^2)\vec{Z}$$

Equation 6

In the following, distance measurement in a typical arrangement example of the LF transmitters and the LF receiving antennas (e.g., the arrangement described in FIG. 4) will be described first. A magnetic flux density at each LF receiving antenna of the transmission coil that receives a magnetic field emitted by an LF transmitter α of the reception coil at time t0 may be expressed by Equation 7 below.

$\overline{B}(LF\text{Receive Antenna } A, t0) = \overline{B}LFAAy,t0 \cdot \overline{B}LFA\alpha y,t0$ $\overline{B}(LF \text{ Receive Antenna } B, t0) = \overline{B}LFABy,t0 \cdot \overline{B}LFA\alpha y,t0$ $\overline{B}(LF \text{ Receive Antenna } C, t0) = \overline{B}LFACy,t0 \cdot \overline{B}LFA\alpha y,t0$ $\overline{B}(LF \text{ Receive Antenna } D, t0) = \overline{B}LFADy,t0 \cdot \overline{B}LFA\alpha y,t0$   Equation 7

Additionally, a magnetic flux density at each LF receiving antenna of the transmission coil that receives a magnetic field emitted by an LF transmitter 3 of the reception coil at time t1 may be expressed by Equation 8 below.

$\overline{B}(LF \text{ Receive Antenna } A, t1) = \overline{B}LFAAy,t1 \cdot \overline{B}LFA\beta y,t1$ $\overline{B}(LF \text{ Receive Antenna } B, t1) = \overline{B}LFABy,t1 \cdot \overline{B}LFA\beta y,t1$ $\overline{B}(LF \text{ Receive Antenna } C, t1) = \overline{B}LFACy,t1 \cdot \overline{B}LFA\beta y,t1$ $\overline{B}(LF \text{ Receive Antenna } D, t1) = \overline{B}LFADy,t1 \cdot \overline{B}LFA\beta y,t1$   Equation 8

Since the distance between the transmission coil and the reception coil may be calculated using the RSSI, the RSSI equations are summarized as follows.

RSSI ($\overline{B}(LF$ Receive Antenna $A$, $t0$), $\overline{B}(LF$ Receive Antenna $B$, $t0$), $\overline{B}(LF$ Receive Antenna $C$, $t0$), $\overline{B}(LF$ Receive Antenna $D$, $t0$))

RSSI ($\overline{B}$(LF Receive Antenna A, t1), $\overline{B}$(LF Receive Antenna B, t1), $\overline{B}$(LF Receive Antenna C, t1), $\overline{B}$(LF Receive Antenna D, t1)))   Equation 9

$$RSSI\left(d_A = \frac{\lambda}{4\pi}10^{\frac{B_{A,t0}-B_{A,t1}}{20}}, d_B = \frac{\lambda}{4\pi}10^{\frac{B_{B,t0}-B_{B,t1}}{20}},\right.$$
$$\left.d_C = \frac{\lambda}{4\pi}10^{\frac{B_{C,t0}-B_{C,t1}}{20}}, d_D = \frac{\lambda}{4\pi}10^{\frac{B_{D,t0}-B_{D,t1}}{20}}\right)$$   Equation 10

From the final RSSI equation, since the LF receiving antennas of the transmission coil receive all values of magnetic fields emitted by the transmitter, the LF transmitters of the reception coil are unable to be distinguished at a very near distance. This is true even when a three-axis (i.e., triaxial) LF sensor is disposed in the transmission coil, not the LF receiving antenna. A magnetic flux density in each LF sensor of the transmission coil may be as follows.

A magnetic flux density at each triaxial LF sensor disposed in the transmission coil that receives the magnetic field emitted by the LF transmitter a of the reception coil at time t0 may be expressed by Equation 11 below.

$\overline{B}$(LF Receive Antenna A, t0)= $\overline{B}$LFSNSR(Ax+Ay+Az),t0·$\overline{B}$LFAαy,t0

$\overline{B}$(LF Receive Antenna B, t0)= $\overline{B}$LFSNSR(Bx+By+Bz),t0·$\overline{B}$LFAαy,t0

$\overline{B}$(LF Receive Antenna C, t0)= $\overline{B}$LFSNSR(Cx+Cy+Cz),t0·$\overline{B}$LFAαy,t0

$\overline{B}$(LF Receive Antenna D, t0)= $\overline{B}$LFSNSR(Dx+Dy+Dz),t0·$\overline{B}$LFAαy,t0   Equation 11

Additionally, a magnetic flux density at each triaxial LF sensor disposed in the transmission coil that receives the magnetic field emitted by the LF transmitter β of the reception coil at time t1 may be expressed by Equation 12 below.

$\overline{B}$(LF Receive Antenna A, t1)= $\overline{B}$LFSNSR(Ax+Ay+Az),t1·$\overline{B}$LFAβy,t1

$\overline{B}$(LF Receive Antenna B, t1)= $\overline{B}$LFSNSR(Bx+By+Bz),t1·$\overline{B}$LFAβy,t1

$\overline{B}$(LF Receive Antenna C, t1)= $\overline{B}$LFSNSR(Cx+Cy+Cz),t1·$\overline{B}$LFAβy,t1

$\overline{B}$(LF Receive Antenna D, t1)= $\overline{B}$LFSNSR(Dx+Dy+Dz),t1·$\overline{B}$LFAβy,t1   Equation 12

The final RSSI equations are as follows, and, since the LF sensors of the transmission coil receive all values of magnetic fields emitted by the transmitter, the LF transmitters of the reception coil are unable to be distinguished at a very near distance.

RSSI ($\overline{B}$(LF Receive Antenna A, t0), $\overline{B}$(LF Receive Antenna B, t0), $\overline{B}$(LF Receive Antenna C, t0), $\overline{B}$(LF Receive Antenna D, t0)))

RSSI ($\overline{B}$(LF Receive Antenna A, t1), $\overline{B}$(LF Receive Antenna B, t1), $\overline{B}$(LF Receive Antenna C, t1), $\overline{B}$(LF Receive Antenna D, t1)))   Equation 13

To solve this problem, when magnetic field analysis and distance measurement are performed via the LF receiving antennas of the transmission coil and the LF transmitters of the reception coil, which have the arrangement according to the present disclosure, the LF receiving antenna receives a partial magnetic field, which eliminates the difficulty in calculating a center point of the transmission coil and a center point of the reception coil. In a vector field, when orthogonal components of a coordinate system meet, they become zero. Therefore, to summarize, Equations below may be derived. Although a sine component of each exists due to the coordinate system, for simplicity, they will be represented simply.

Figure 14A:
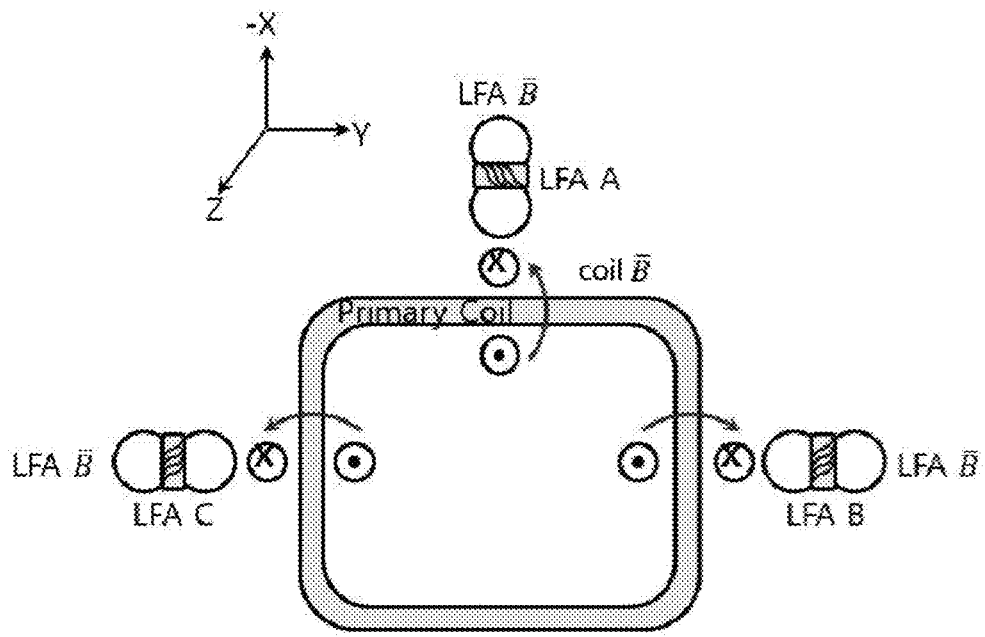
FIGS. 14A to 14D, inclusive, are diagrams illustrating arrangement structures of LF transmitters and LF receiving antennas according to exemplary embodiments of the present disclosure.
Figure 14A:
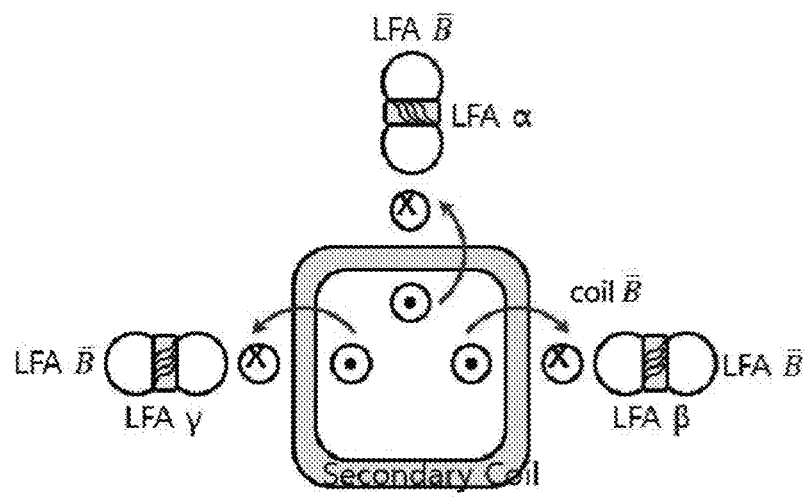
Figure 14B:
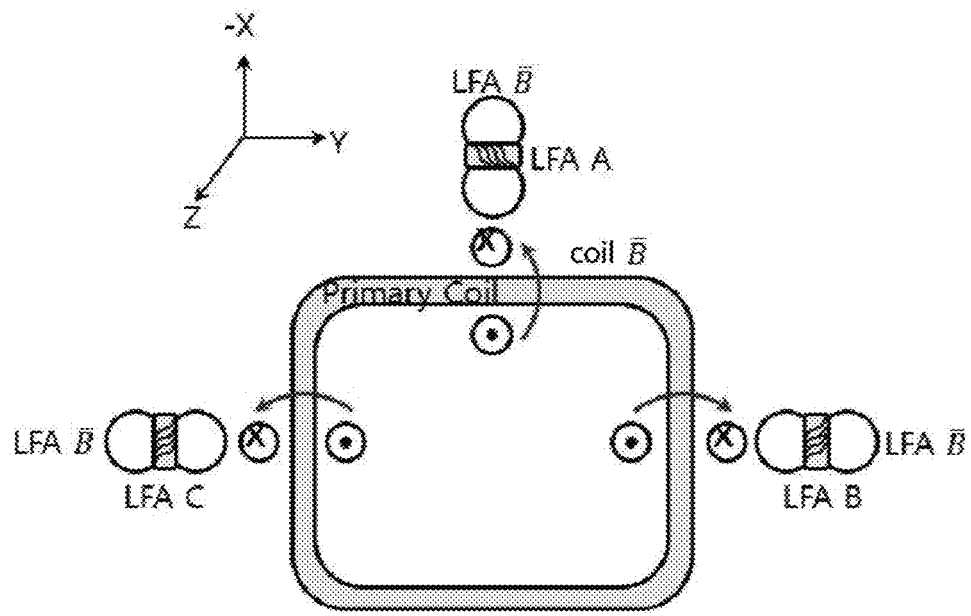
Figure 14B:
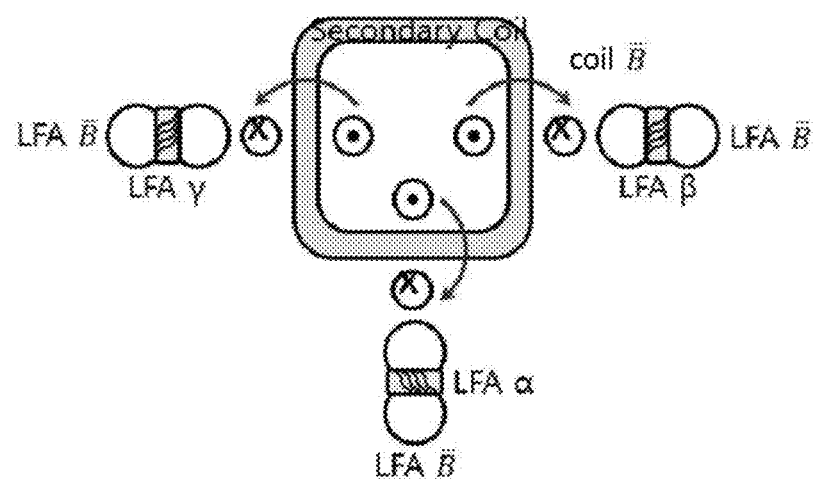
Figure 14C:
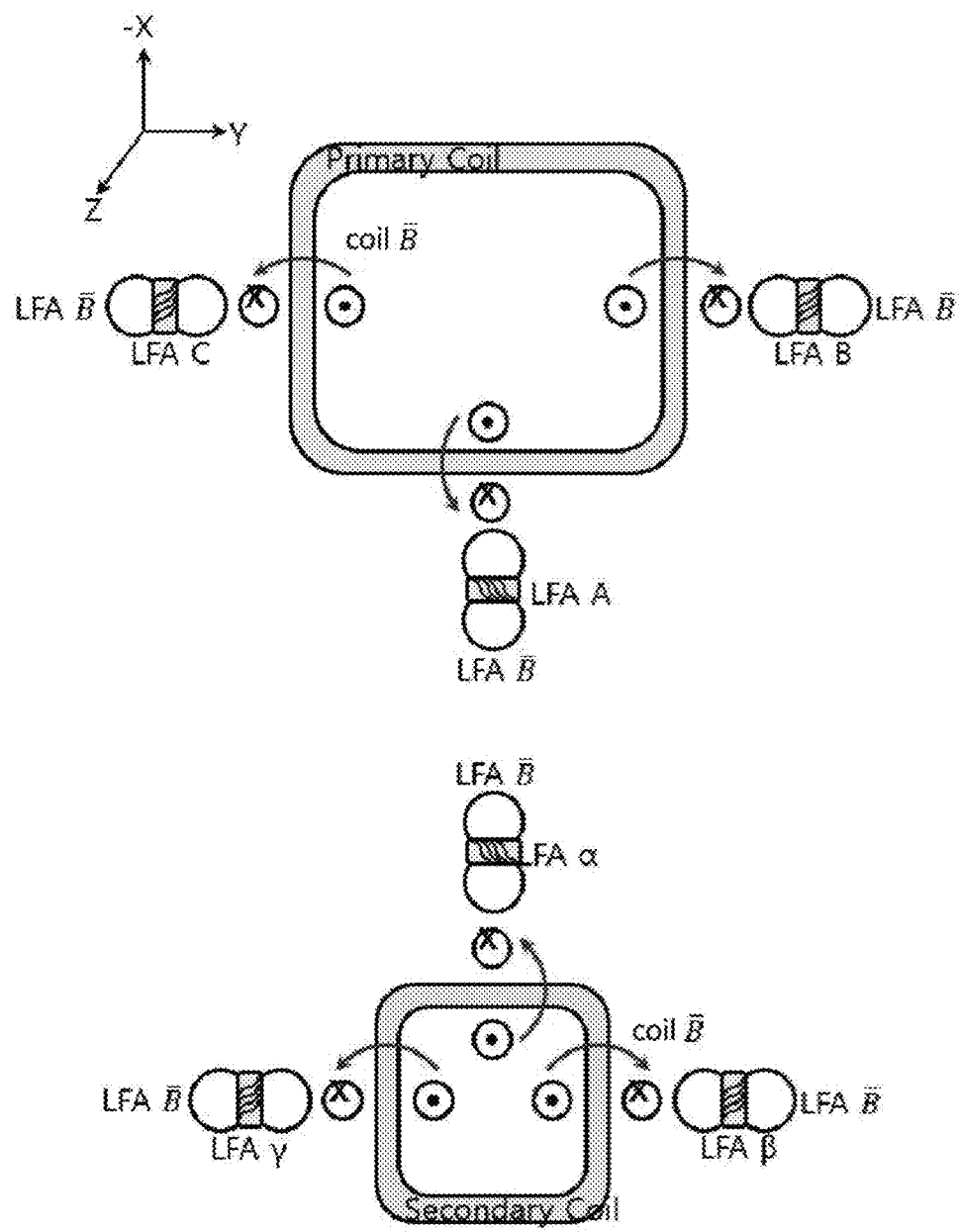
Figure 14D:
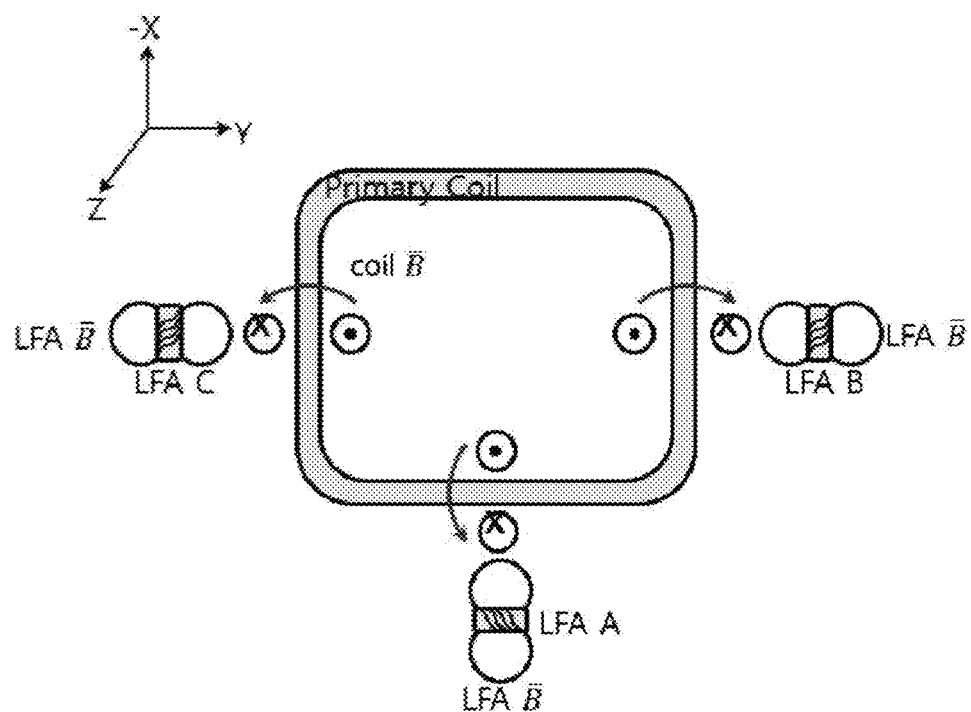
Figure 14D:
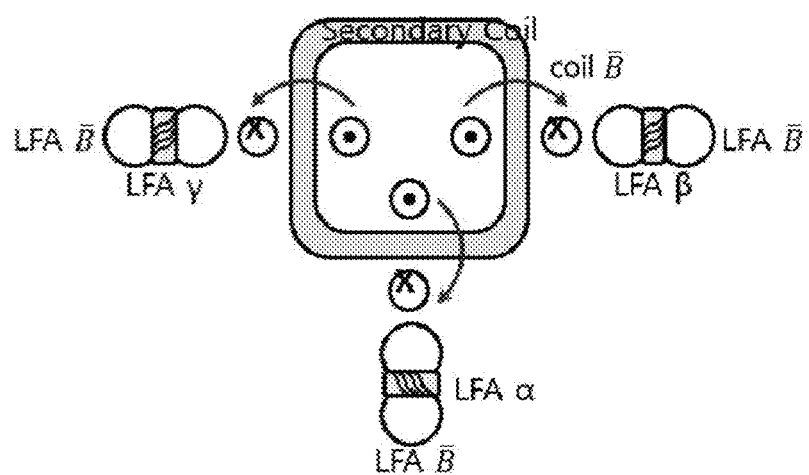

In an antenna arrangement structure according to an exemplary embodiment of the present disclosure, for example, in the antenna arrangement structure as shown in FIG. 14A, a magnetic flux density at each LF receiving antenna of the transmission coil that receives the magnetic field emitted by the LF transmitter α of the reception coil at time t0 may be expressed as shown in Equation 14 below.

$\overline{B}$(LF Receive Antenna A, t0)=$\overline{B}$LFAAx,t0·$\overline{B}$LFAαx,t0

$\overline{B}$(LF Receive Antenna B, t0)=$\overline{B}$LFABy,t0· $\overline{B}$LFAαx,t0=0

$\overline{B}$(LF Receive Antenna C, t0)=$\overline{B}$LFACy,t0· $\overline{B}$LFAαx,t0=0   Equation 14

Additionally, a magnetic flux density at each LF receiving antenna of the transmission coil that receives the magnetic field emitted by the LF transmitter β of the reception coil at time t1 may be expressed as shown in Equation 15 below.

$\overline{B}$(LF Receive Antenna A, t1)=$\overline{B}$LFAAx,t1· $\overline{B}$LFAβy,t1=0

$\overline{B}$(LF Receive Antenna B, t1)=$\overline{B}$LFABy,t1·$\overline{B}$LFAβy,t1

$\overline{B}$(LF Receive Antenna C, t1)=$\overline{B}$LFACy,t1·$\overline{B}$LFAβy,t1   Equation 15

Additionally, a magnetic flux density at each LF receiving antenna of the transmission coil that receives the magnetic field emitted by the LF transmitter γ of the reception coil at time t2 may be expressed as shown in Equation 16 below.

$\overline{B}$(LF Receive Antenna A, t2)=$\overline{B}$LFAAx,t2· $\overline{B}$LFAγy,t2=0

$\overline{B}$(LF Receive Antenna B, t2)=$\overline{B}$LFABy,t2·$\overline{B}$LFAγy,t2

$\overline{B}$(LF Receive Antenna C, t2)=$\overline{B}$LFACy,t2·$\overline{B}$LFAγy,t2   Equation 16

The final RSSI equations in the arrangement structure of the LF transmitters and LF receiving antennas according to an exemplary embodiment of the present disclosure may be summarized as follows.

RSSI ($\overline{B}$(LF Receive Antenna A, t0), $\overline{B}$(LF Receive Antenna B, t0), $\overline{B}$(LF Receive Antenna C, t0))

RSSI ($\overline{B}$(LF Receive Antenna A, t1), $\overline{B}$(LF Receive Antenna B, t1), $\overline{B}$(LF Receive Antenna C, t1))

RSSI ($\overline{B}$(LF Receive Antenna A, t2), $\overline{B}$(LF Receive Antenna B, t2), $\overline{B}$(LF Receive Antenna C, t2))   Equation 17

In summary, when one of the LF receiving antennas of the transmission coil is disposed perpendicular to other receiving antennas and one of the LF transmitters of the reception coil is disposed perpendicular to other transmitters, for example, in the configuration of the LF antennas shown in FIG. 14A, if the alignment between the transmission coil and the reception coil is completed perfectly, the analysis equations of magnetic fields, which may be obtained finally, may be summarized as shown in Equation 18 below.

$\overline{B}$(LF Receive Antenna A, t0)≈$\overline{B}$LFAAx,t0· $\overline{B}$LFAαx,t0=Maximum $\overline{B}(LF$ Receive Antenna $B$, $t1) \approx \overline{BLFAB}y,t1 \cdot \overline{BLFAB}y,t1 =$
$\overline{B}(LF$ Receive Antenna $C$, $t1) \approx \overline{BLFAC}y,t1 \cdot$
$\overline{BLFAB}y,t1 =$ Maximum $\overline{B}(LF$ Receive Antenna $C$, $t2) \approx \overline{BLFAC}y,t2 \cdot \overline{BLFA}\gamma y,t2 =$
$\overline{B}(LF$ Receive Antenna $C$, $t1) \approx \overline{BLFAC}y,t2 \cdot$
$\overline{BLFA}\gamma y,t2 =$ Maximum        Equation 18

However, in Equation 18, the maximum value of $\overline{B}$(LF Receive Antenna A) may be different from the maximum value of $\overline{B}$(LF Receive Antenna B)=$\overline{B}$(LF Receive Antenna C)).

According to the exemplary embodiments of the present disclosure described above, in the antenna arrangement considering both the LF receiving antennas of the transmission pad and the LF transmitters of the reception pad, analysis simulation confirms whether the LF magnetic field may be recognized at a very near distance.

Figure 17:
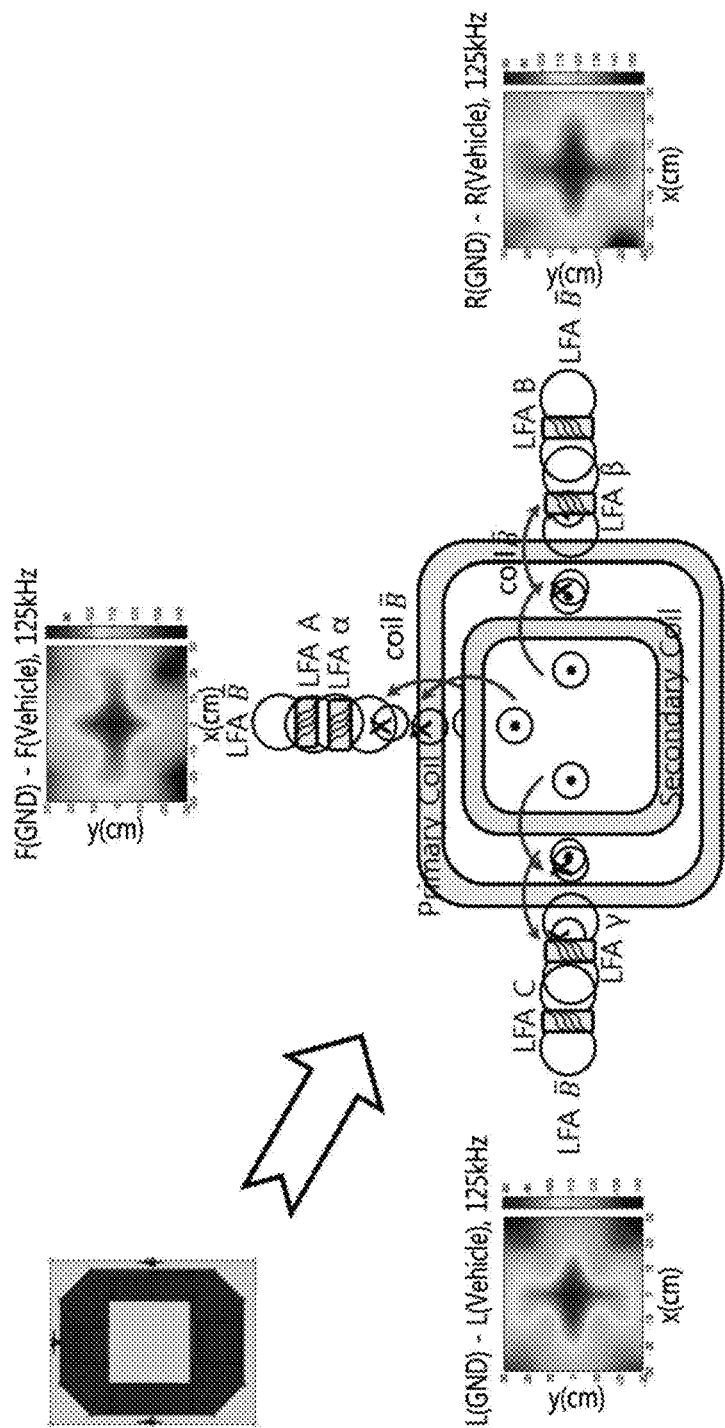
FIGS. 17 to 21, inclusive, are diagrams illustrating an analysis simulation result on whether magnetic field recognition is possible according to an alignment state of a transmission coil and a reception coil in an arrangement of LF transmitters and LF receiving antennas according to an exemplary embodiment of the present disclosure.
Figure 18:
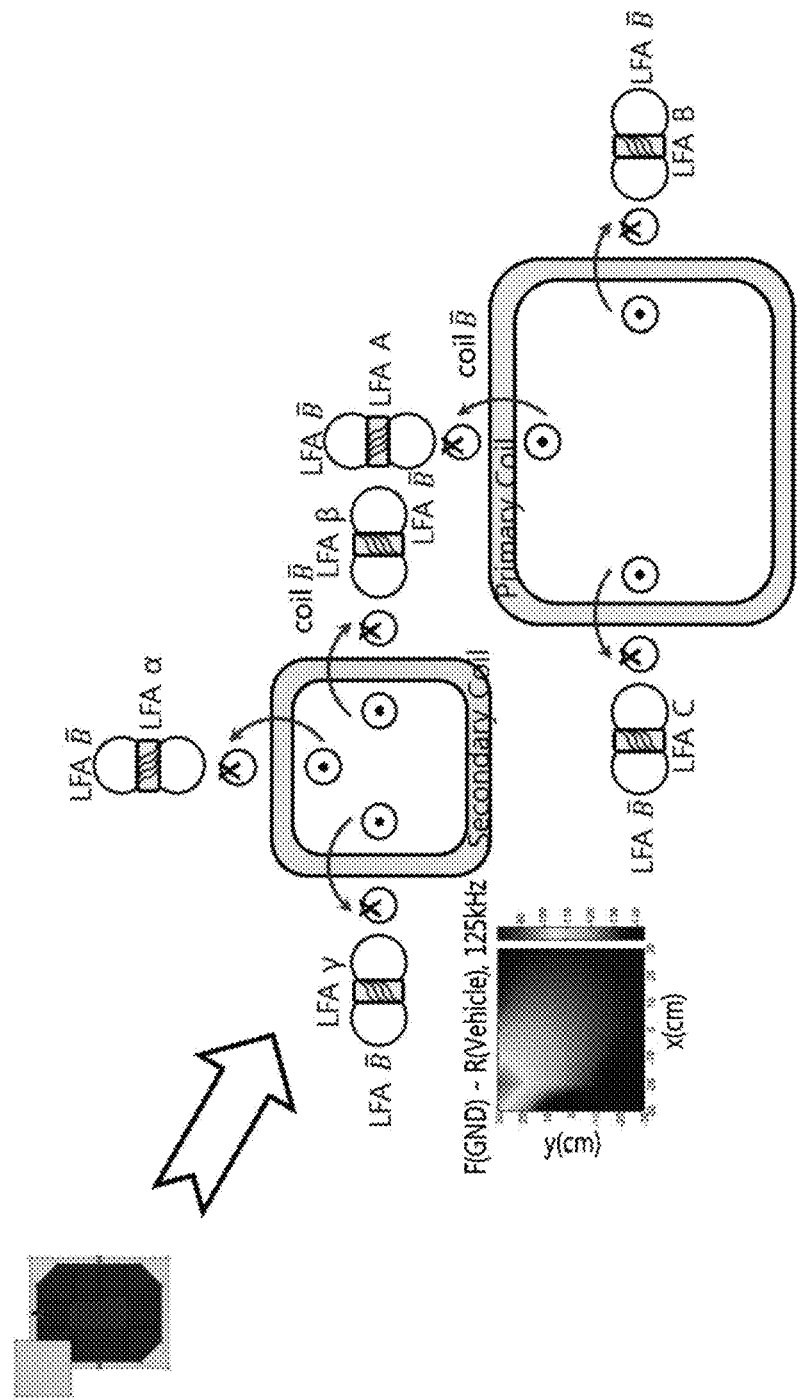
Figure 19:
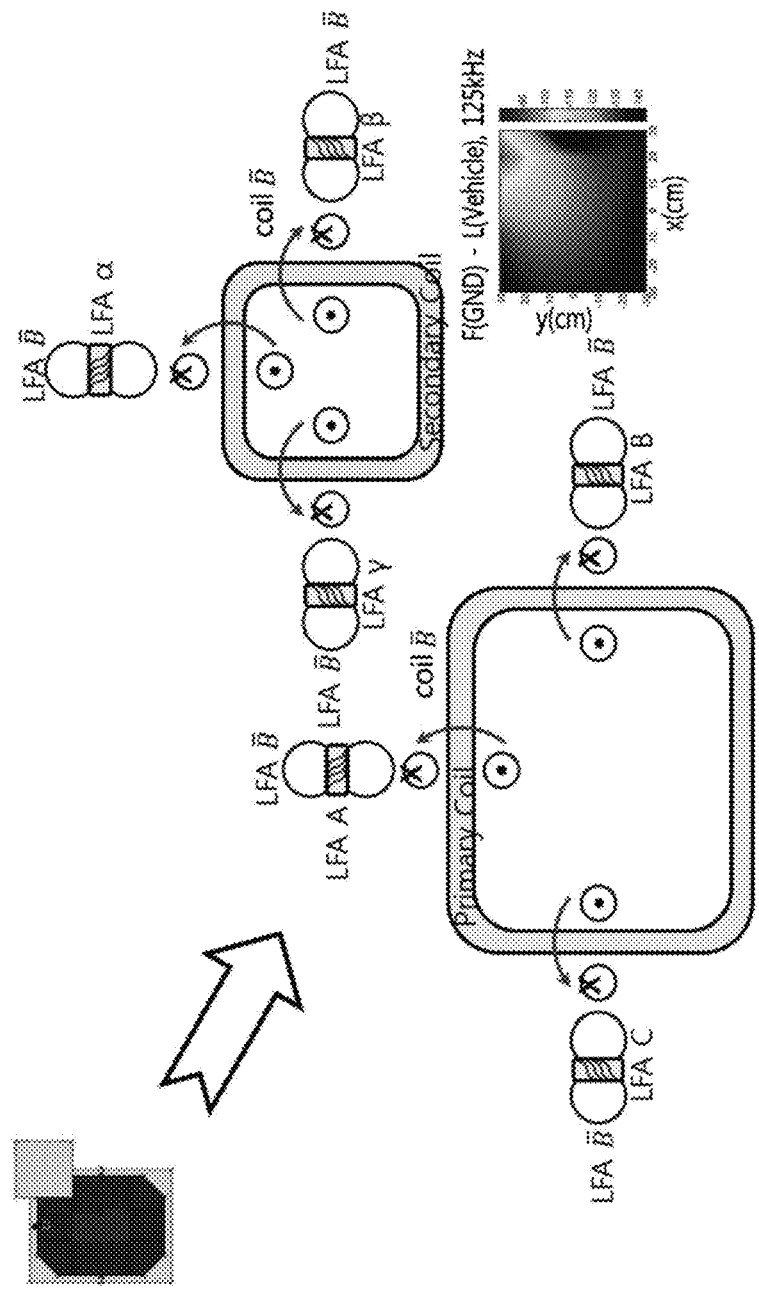
Figure 20:
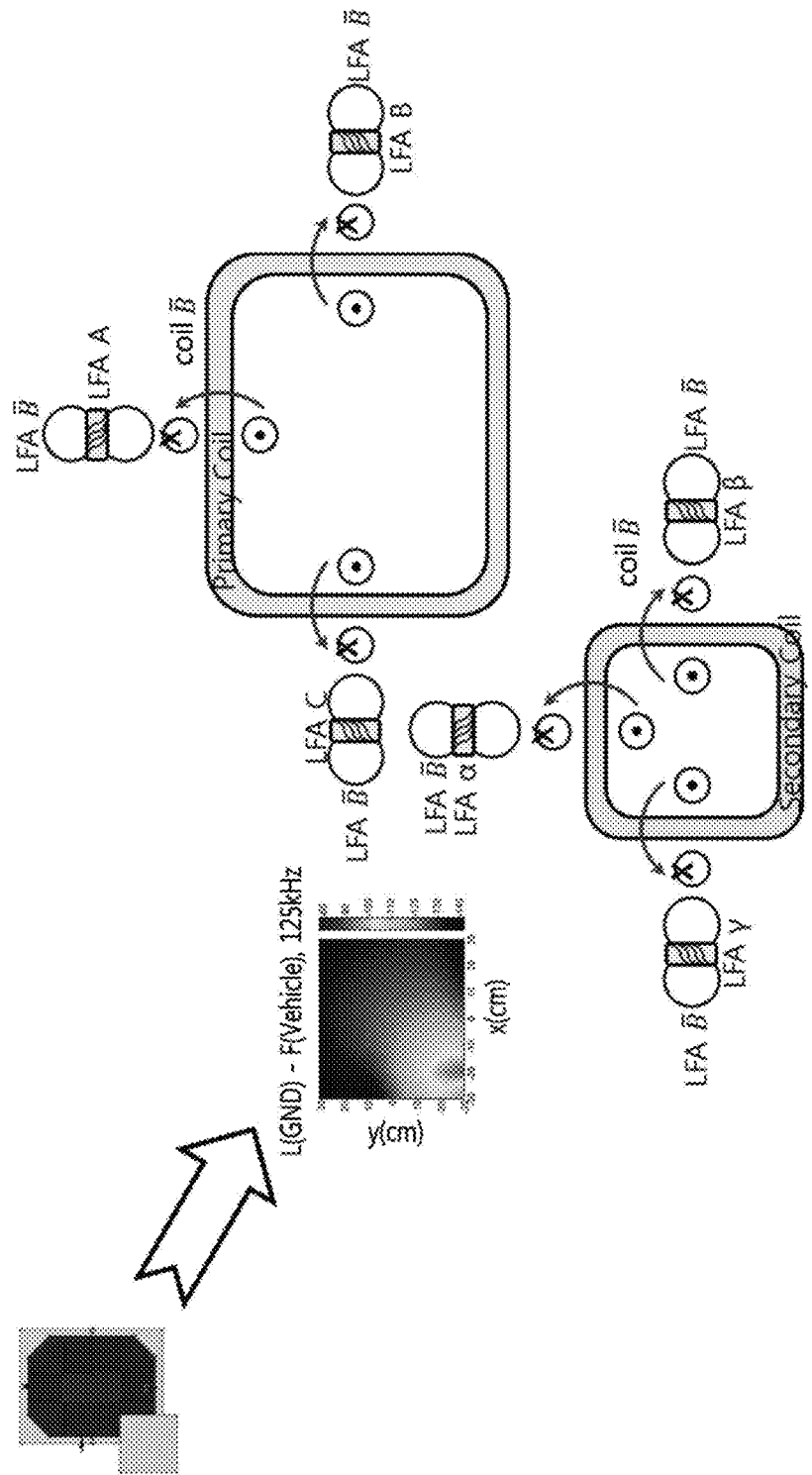
Figure 21:
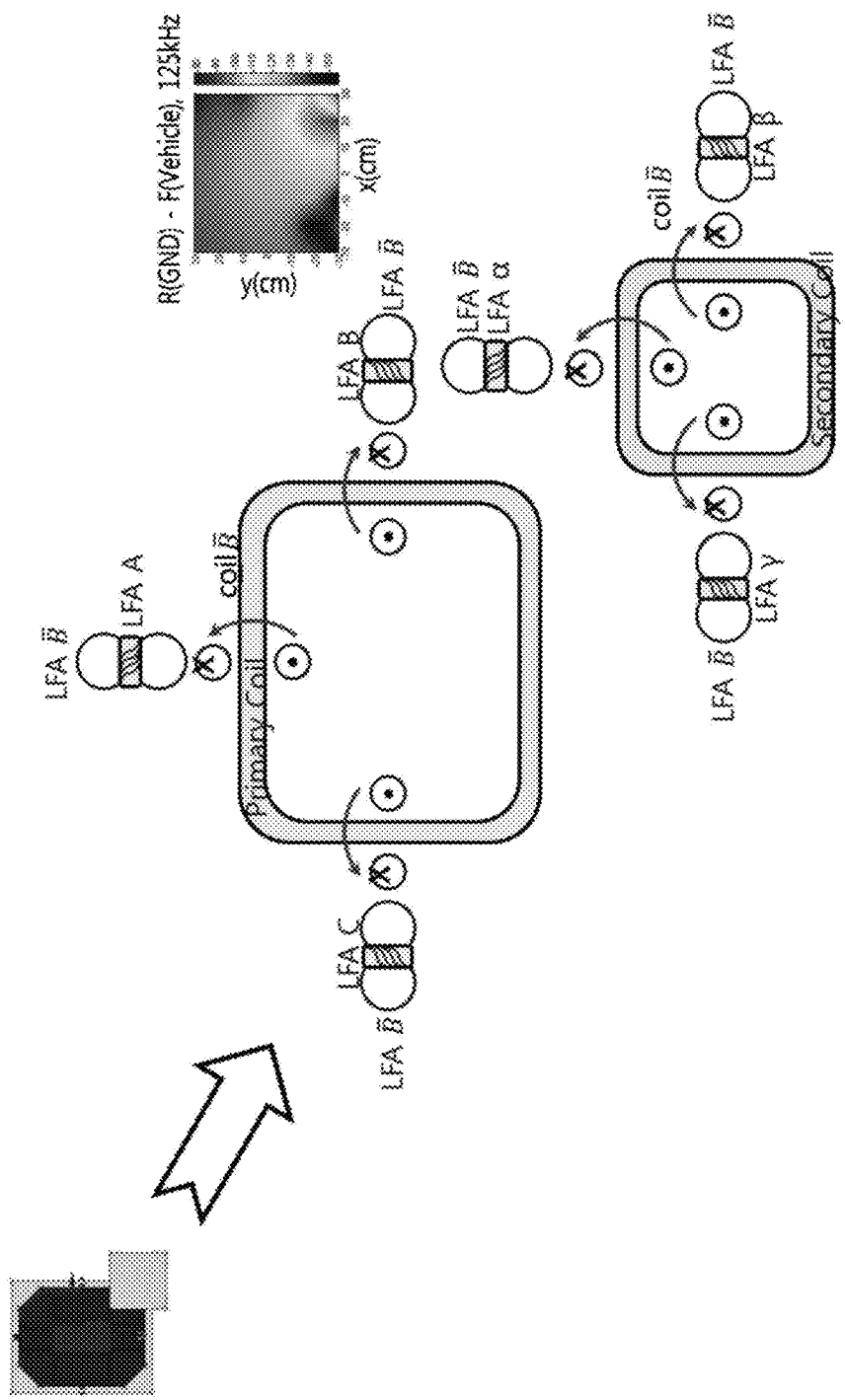

FIGS. 17 to 21 are diagrams illustrating an analysis simulation result on whether magnetic field recognition is possible according to an alignment state of a transmission coil and a reception coil in an arrangement of LF transmitters and LF receiving antennas according to an exemplary embodiment of the present disclosure. FIG. 17 illustrates a magnetic field when the alignment of a power supply side transmission coil 21 and a vehicle side reception coil 11 is made close to 100%. FIGS. 18 to 21 illustrate simulation results when the reception coil is located near (e.g., proximate to) the corner of the transmission coil. FIG. 18 illustrates a case where the reception coil 11 is located at an upper left corner of the transmission coil 21, FIG. 19 illustrates a case where the reception coil 11 is located at an upper right corner of the transmission coil 21, FIG. 20 illustrates a case where the reception coil 11 is located at a lower left corner of the transmission coil 21, and FIG. 21 illustrates a case where the reception coil 11 is located at a lower right corner of the transmission coil 21. As shown in FIGS. 17 to 21, the position of the reception coil with respect to the transmission coil is presented in a form that may be recognized with a magnetic field-related simulation result value, so that the LF magnetic field may be recognized even at a very near distance.

Figure 22:
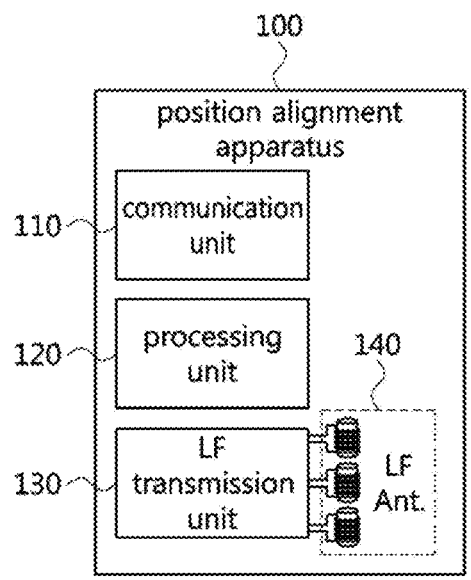
FIG. 22 is a block diagram illustrating a position alignment apparatus according to an exemplary embodiment of the present disclosure.

FIG. 22 is a block diagram illustrating a position alignment apparatus according to an exemplary embodiment of the present disclosure. As shown in FIG. 22, a position alignment apparatus 100 according to an exemplary embodiment of the present disclosure may include a communication unit 110, a processing unit 120, an LF transmission unit 130, and at least one LF transmitter 140.

The position alignment apparatus 100 may be a VA or a part of the VA, or may be connected to the VA. In other words, the component of the position alignment apparatus 100 is not limited to its name, and the component may be defined by a function. Additionally, one component constituting the apparatus may perform a plurality of functions, and a plurality of components constituting the apparatus may perform one function.

The communication unit 110 may include a communication module configured to communicate with a magnetic field detection apparatus 200 to be described later. In particular, the communication module may include a communication module configured to perform WIFI communication, and may also include a communication module configured to perform 3G communication and 4G communication, but is not limited thereto. The communication unit 110 may be configured to: search for a parking space where a GA is located using the communication module, communicate with the magnetic field detection apparatus 200 connected to the GA for alignment between the GA and the VA, and receive magnetic field measurements from the magnetic field detection apparatus 200.

Additionally, the communication unit 110 may be configured to measure at least one of a received signal strength indicator (RSSI), a time of flight (ToF), a time difference of flight (TDoF), and a time of arrival (ToA), and a time difference of arrival. The processing unit 120 may be configured to verify whether at least one antenna connected to the LF transmission unit 130 to be described later is driven normally, operate the at least one antenna, and perform position alignment between the transmission pad and the reception pad using the magnetic field measurements received using the communication unit 110. The LF transmission unit 130 may be configured to verify whether the connected antenna is driven normally according to the operation of the processing unit 120, and may be configured to operate the at least one transmitter according to the present disclosure.

Additionally, the position alignment apparatus 100 according to an exemplary embodiment of the present disclosure may include at least one processor and a memory storing at least one instruction for executing the above-described operations with the at least one processor. The processor may be configured to execute the at least one instruction stored in the memory, and may be a central processing unit (CPU), a graphics processing unit (GPU), or a dedicated processor configured to execute the methods according to the exemplary embodiments of the present disclosure. The memory may include a volatile storage medium and/or a nonvolatile storage medium, and may be comprised of a read only memory (ROM) and/or a random access memory (RAM).

Particularly, the at least one instruction may be configured to cause the processor to emit at least one LF magnetic field using one or more transmitters disposed in a reception receiving power transferred by a transmission pad of a GA; receive from the GA at least one magnetic field related value detected by one or more LF receiving devices disposed in the transmission pad; and perform position alignment between the transmission pad and the reception pad using the at least one magnetic field related value, wherein at least part of the transmitters are disposed to arrange at least one magnetic field formed by the at least part of the transmitters in a 0°, 90°, 180°, or 270° direction with respect to at least one magnetic field formed by at least one part of the one or more LF receiving devices.

Figure 23:
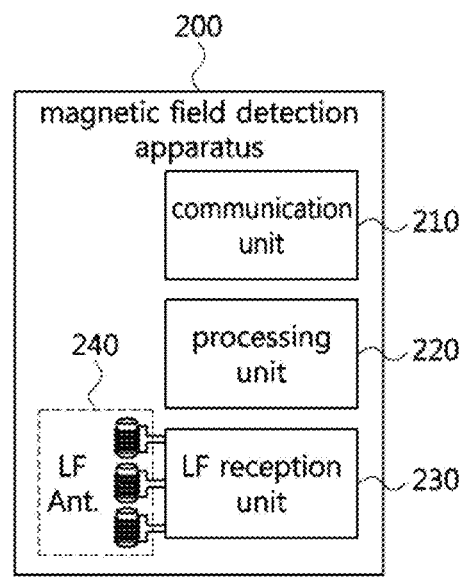
FIG. 23 is a block diagram illustrating a magnetic field detection apparatus according to an exemplary embodiment of the present disclosure.

FIG. 23 is a block diagram illustrating a magnetic field detection apparatus according to an exemplary embodiment of the present disclosure. As shown in FIG. 23, a magnetic field detection apparatus 200 according to an exemplary embodiment of the present disclosure may include a communication unit 210, a processing unit 220, and an LF reception unit 230.

The magnetic field detection apparatus 200 may be a GA or a part of the GA, or may be connected to the GA. In other words, the component of the magnetic field detection apparatus 200 is not limited to its name, and the component may be defined by a function. Additionally, one component constituting the apparatus may perform a plurality of functions, and a plurality of components constituting the apparatus may perform one function.

The communication unit 210 may include a communication module configured to communicate with the position alignment apparatus 100. In particular, the communication module may include a communication module configured to perform WIFI communication, and may also include a communication module configured to perform 3G communication and 4G communication, but is not limited thereto. The communication unit 210 may be configured to transmit magnetic field measurements to the VA.

Additionally, the communication unit 210 may be connected to the position alignment apparatus 100 for alignment between the GA and the VA, and may be configured to transmit the magnetic field measurements measured by the processing unit 220 to the position alignment apparatus 100. The processing unit 220 may be configured to measure the magnetic field measurements based on information regarding magnetic fields detected by the LF reception unit 230 to be described later. In particular, the information regarding the magnetic fields may exist for each antenna. For example, each of three receiving antennas connected to the position alignment apparatus 100 may be configured to detect magnetic fields of three transmitters. In particular, nine pieces of magnetic field information may be present. The processing unit 220 may be configured to provide the magnetic field measurements to the communication unit 210.

The LF reception unit 230 may be connected to a plurality of, for example, three receiving antennas ANT1, ANT2, and ANT3 located in the GA, and obtain information regarding magnetic fields emitted by the three transmitters of the position alignment apparatus 100, which are detected by the three receiving antennas. The LF reception unit 230 may be configured to provide the processing unit 220 with the obtained information on the magnetic fields.

Additionally, the magnetic field detection apparatus 200 according to an exemplary embodiment of the present disclosure may include at least one processor and a memory storing at least one instruction for executing the above-described operations via the at least one processor. The processor may be configured to execute the at least one instruction stored in the memory, and may be a central processing unit (CPU), a graphics processing unit (GPU), or a dedicated processor configured to execute the methods according to the exemplary embodiments of the present disclosure. The memory may be comprised of a volatile storage medium and/or a nonvolatile storage medium, and may be comprised of a read only memory (ROM) and/or a random access memory (RAM).

The at least one instruction may be configured to cause the processor to detect an LF magnetic field emitted from one or more transmitters disposed on the reception pad of a VA; measure at least one magnetic field related value detected by one or more LF receiving devices disposed on the transmission pad of the GA; and calculate a distance between the transmission pad and the reception pad using the at least one magnetic field related value.

At least one part of the one or more LF receiving devices may be disposed to arrange at least one magnetic field formed by the at least one part of the one or more LF receiving devices in a 0°, 90°, 180°, or 270° direction with respect to at least one magnetic field formed by at least part of the transmitters.

FIG. 24 is a flowchart illustrating a method for measuring a distance between a transmission pad and a reception pad according to an exemplary embodiment of the present disclosure. A distance measurement method illustrated in FIG. 24 may be performed by a GA to align positions between a transmission pad and a reception pad for wireless power transfer. As shown in FIG. 24, the GA may be configured to detect a low frequency (LF) magnetic field emitted from one or more transmitters disposed on the reception pad of a VA (S2410), and measure at least one magnetic field related value detected by one or more LF receiving devices disposed on the transmission pad of the GA (S2420).

The VA may be configured to calculate a distance between the transmission pad and the reception pad using the at least one magnetic field related value. The calculated distance between the transmission pad and the reception pad may be transferred to the vehicle, and may be used for the vehicle to perform position alignment. In particular, at least one part of the one or more LF receiving devices may be disposed to arrange at least one magnetic field formed by the at least one part of the one or more LF receiving devices is formed in a 0° or 180° direction with respect to at least one magnetic field formed by at least one part of the one or more transmitting antennas.

Meanwhile, according to another exemplary embodiment of the present disclosure, the distance measurement method may be performed by a vehicle or a VA. In particular, the VA may be configured to receive the magnetic field related measurements from the GA, and calculate the distance between the two pads based on the magnetic field related measurements.

Thus, according to another exemplary embodiment of the present disclosure, a position alignment method performed by a vehicle assembly (VA) including a reception pad receiving power transmitted from a transmission pad of a ground assembly (GA), may include transmitting at least one magnetic field using one or more transmitting devices disposed on the reception pad, the one or more transmitting devices operating with low frequency (LF); receiving at least one magnetic field related value from the GA, the at least one magnetic field being detected by one or more LF receiving devices disposed on the transmission pad of the GA; and calculating, by a controller, a distance between the transmission pad and the reception pad using the at least one magnetic field related value. At least one part of the one or more transmitting devices is disposed to arrange at least one magnetic field formed by the at least one part of the one or more transmitting devices in a 0°, 90°, 180°, or 270° direction with respect to at least one magnetic field formed by at least one part of the one or more LF receiving devices.

While some aspects of the present disclosure have been described in the context of an apparatus, the present disclosure may also represent a description according to a corresponding method, wherein the block or apparatus corresponds to a method step or a feature of the method step. Similarly, aspects described in the context of a method may also be represented by features of the corresponding block or item or corresponding device. Some or all of the method steps may be performed by (or using) a hardware device such as, for example, a microprocessor, a programmable computer, or an electronic circuit. In various exemplary embodiments, one or more of the most important method steps may be performed by such an apparatus.

In exemplary embodiments, a programmable logic device (e.g., a field programmable gate array (FPGA)) may be used to perform some or all of the functions of the methods described herein. In addition, the FPGA may operate in conjunction with a microprocessor to perform one of the methods described herein. Generally, the methods are preferably performed by some hardware device.

The foregoing description has been directed to exemplary embodiments of the present disclosure. It will be apparent, however, that other variations, substitutions and modifications may be made to the described exemplary embodiments, with the attainment of some or all of their advantages. Accordingly, this description is to be taken only by way of example and not to otherwise limit the scope of the exemplary embodiments herein. Therefore, it is the object of the appended claims to cover all such variations and modifications as come within the true spirit and scope of the exemplary embodiments herein.

What is claimed is:

1. A position alignment method performed by a vehicle assembly (VA) including a reception pad receiving power transmitted from a transmission pad of a ground assembly (GA), the position alignment method comprising:
    transmitting at least one magnetic field by two or more transmitting devices disposed on the reception pad, the two or more transmitting devices operating with low frequency (LF);
    receiving, at the reception pad at least one magnetic field related value from the GA, the at least one magnetic field being detected by two or more LF receiving devices disposed on the transmission pad of the GA; and
    calculating, by a controller, a distance between the transmission pad and the reception pad using the at least one magnetic field related value,
    wherein at least one part of the two or more transmitting devices is disposed to arrange at least one magnetic field formed by the at least one part of the two or more transmitting devices in a 0°, 90°, 180°, or 270° direction with respect to at least one magnetic field formed by at least one part of the two or more LF receiving devices,
    wherein each of the two or more transmitting devices is configured with a single-axis antenna and each of the two or more LF receiving devices is configured with a single-axis LF antenna,
    wherein each of the two or more transmitting devices is disposed such that a magnetic field formed by each of the two or more transmitting devices avoids affecting a magnetic field associated with power transfer between the transmission pad and the reception pad, and each of the two or more LF receiving devices is disposed such that a magnetic field formed by each of the two or more LF receiving devices avoids affecting a magnetic field associated with power transfer between the transmission pad and the reception pad, and
    wherein the two or more transmitting devices and the two or more LF receiving devices are disposed at points where a magnetic field formed by the reception coil of the reception pad or the transmission coil of the transmission pad is uniformly distributed.

2. The position alignment method according to claim 1, wherein the two or more transmitting devices include three or more LF antennas disposed on respective sides of the reception pad.

3. The position alignment method according to claim 1, wherein the two or more LF receiving devices include three or more LF antennas or LF sensors disposed on respective sides of the transmission pad.

4. The position alignment method according to claim 1, wherein a first transmitting device among the two or more transmitting devices is disposed on a side different from a side on which a second transmitting device among the two or more transmitting devices is disposed, and the first transmitting device is disposed perpendicular to the second transmitting device.

5. The position alignment method according to claim 1, wherein a first LF receiving device among the two or more LF receiving devices is disposed on a side different from a side on which a second LF receiving device among the two or more LF receiving devices is disposed, and the first LF receiving device is disposed perpendicular to the second LF receiving device.

6. A magnetic field detection apparatus, comprising:
    a processor; and
    a memory configured to store at least one instruction executable by the processor,
    wherein, when executed by the processor, the at least one instruction configures the processor to:
    detect a low frequency (LF) magnetic field transmitted from two or more transmitting devices disposed on a reception pad of a vehicle assembly (VA);
    measure at least one magnetic field related value detected by two or more LF receiving devices disposed on a transmission pad of a ground assembly (GA); and
    calculate a distance between the transmission pad and the reception pad using the at least one magnetic field related value,
    wherein at least one part of the two or more LF receiving devices is disposed to arrange at least one magnetic field formed by the at least one part of the two or more LF receiving devices in a 0°, 90°, 180°, or 270° direction with respect to at least one magnetic field formed by at least one part of the two or more transmitting devices,
    wherein each of the two or more transmitting devices is configured with a single-axis antenna and each of the two or more LF receiving devices is configured with a single-axis LF antenna,
    wherein each of the two or more transmitting devices is disposed such that a magnetic field formed by each of the two or more transmitting devices avoids affecting a magnetic field associated with power transfer between the transmission pad and the reception pad, and each of the two or more LF receiving devices is disposed such that a magnetic field formed by each of the two or more LF receiving devices avoids affecting a magnetic field associated with power transfer between the transmission pad and the reception pad, and
    wherein the two or more transmitting devices and the two or more LF receiving devices are disposed at points where a magnetic field formed by the reception coil of the reception pad or the transmission coil of the transmission pad is uniformly distributed.

7. The magnetic field detection apparatus according to claim 6, wherein the two or more LF receiving devices include three or more LF antennas or LF sensors disposed on respective sides of the transmission pad.

8. The magnetic field detection apparatus according to claim 6, wherein a first LF receiving device among the two or more LF receiving devices is disposed on a side different from a side on which a second LF receiving device among the two or more LF receiving devices is disposed, and the first LF receiving device is disposed perpendicular to the second LF receiving device.

9. A position alignment apparatus, comprising:
    a processor; and
    a memory storing at least one instruction executable by the processor,
    wherein, when executed by the processor, the at least one instruction configures the processor to:
    transmit at least one magnetic field using two or more transmitting devices operating with Low Frequency (LF) disposed on a reception pad receiving power transferred by a transmission pad of a ground assembly (GA);

receive from the GA at least one magnetic field related value detected by two or more LF receiving devices disposed on the transmission pad; and perform position alignment between the transmission pad and the reception pad using the at least one magnetic field related value, wherein at least one part of the two or more transmitting devices is disposed to arrange at least one magnetic field formed by the at least one part of the two or more transmitting devices in a 0°, 90°, 180°, or 270° direction with respect to at least one magnetic field formed by at least one part of the two or more LF receiving devices, wherein each of the two or more transmitting devices is configured with a single-axis antenna and each of the two or more LF receiving devices is configured with a single-axis LF antenna, wherein each of the two or more transmitting devices is disposed such that a magnetic field formed by each of the two or more transmitting devices avoids affecting a magnetic field associated with power transfer between the transmission pad and the reception pad, and each of the two or more LF receiving devices is disposed such that a magnetic field formed by each of the two or more LF receiving devices avoids affecting a magnetic field associated with power transfer between the transmission pad and the reception pad, and wherein the two or more transmitting devices and the two or more LF receiving devices are disposed at points where a magnetic field formed by the reception coil of the reception pad or the transmission coil of the transmission pad is uniformly distributed.

10. The position alignment apparatus according to claim 9, wherein the two or more transmitting devices include three or more LF antennas disposed on respective sides of the reception pad.

11. The position alignment apparatus according to claim 9, wherein a first transmitting device among the two or more transmitting devices is disposed on a side different from a side on which a second transmitting device among the two or more transmitting devices is disposed, and the first transmitting device is disposed perpendicular to the second transmitting device.

12. The position alignment apparatus according to claim 9, wherein at least one of the two or more transmitting devices or at least one of the two or more LF receiving devices is a ferrite rod antenna.

* * * * *